United States Patent
Wang et al.

(10) Patent No.: US 10,503,629 B2
(45) Date of Patent: Dec. 10, 2019

(54) DEBUGGING METHOD, MULTI-CORE PROCESSOR, AND DEBUGGING DEVICE

(71) Applicant: HUAWEI TECHNOLOGIES CO., LTD., Shenzhen, Guangdong (CN)

(72) Inventors: Mingfa Wang, Hangzhou (CN); Gang Yu, Beijing (CN); Haichuan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/936,030

(22) Filed: Mar. 26, 2018

(65) Prior Publication Data

US 2018/0217915 A1 Aug. 2, 2018

Related U.S. Application Data

(63) Continuation of application No. PCT/CN2016/099996, filed on Sep. 24, 2016.

(30) Foreign Application Priority Data

Sep. 25, 2015 (CN) .......................... 2015 1 0623830

(51) Int. Cl.
*G06F 11/36* (2006.01)
*G06F 11/22* (2006.01)
(Continued)

(52) U.S. Cl.
CPC ............ *G06F 11/362* (2013.01); *G06F 9/545* (2013.01); *G06F 11/2242* (2013.01);
(Continued)

(58) Field of Classification Search
CPC .................. G06F 9/545; G06F 11/36–3696
(Continued)

(56) References Cited

U.S. PATENT DOCUMENTS 6,886,110 B2 4/2005 O'Brien et al.
7,581,087 B2 * 8/2009 John ................... G06F 11/2236
703/20
(Continued)

FOREIGN PATENT DOCUMENTS

CN 1779652 A 5/2006
CN 1282085 C 10/2006
(Continued)

OTHER PUBLICATIONS

Stollon, N., Real World Multicore Embedded Systems—Chapter 16—Multicore Debug, 2013, pp. 561-602, [retrieved on Aug. 21, 2019], Retrieved from the Internet.*
(Continued)

*Primary Examiner* — Geoffrey R St Leger
(74) *Attorney, Agent, or Firm* — James Anderson Harrison

(57) ABSTRACT

Embodiments of the present invention relate to the field of computer technologies. The embodiments of the present invention provide a debugging method, including: stopping running, by a core A of a multi-core processor, and sending a running stop signal to other cores in a process of stopping running; after receiving a first stop termination instruction and resuming running, executing a debugging information collection function and stopping running after completing the execution of the debugging information collection function; after receiving a second stop termination instruction and resuming running, sending a running resumption instruction to the other cores; and knocking a pending breakpoint in a process of running an operation object of the preset event, so as to enter a debugging state. According to the technical solutions provided in the embodiments of the present invention, kernel mode code and user mode code can be debugged on a same debugging platform.

26 Claims, 7 Drawing Sheets

(51) Int. Cl.
*G06F 9/54* (2006.01)
*G06F 9/445* (2018.01)
*G06F 9/48* (2006.01)

(52) U.S. Cl.
CPC .......... *G06F 11/36* (2013.01); *G06F 11/3648* (2013.01); *G06F 11/3656* (2013.01); *G06F 11/3664* (2013.01); *G06F 9/445* (2013.01); *G06F 9/48* (2013.01)

(58) Field of Classification Search
USPC .................................................. 717/124–135
See application file for complete search history.

(56) References Cited

U.S. PATENT DOCUMENTS

| | | | |
|---|---|---|---|
| 7,707,022 B2 | 4/2010 | O'Brien | |
| 8,024,591 B2* | 9/2011 | Bertelsen | G06F 1/3203 713/323 |
| 8,832,666 B2* | 9/2014 | Singh | G06F 11/3471 717/130 |
| 2004/0098639 A1 | 5/2004 | Liu | |
| 2005/0216895 A1 | 9/2005 | Tran | |
| 2006/0059286 A1* | 3/2006 | Bertone | G06F 9/30014 710/260 |
| 2007/0168651 A1* | 7/2007 | John | G06F 11/2236 712/227 |
| 2007/0266376 A1 | 11/2007 | Yim et al. | |
| 2008/0307244 A1 | 12/2008 | Bertelsen et al. | |
| 2008/0312900 A1* | 12/2008 | Akiba | G06F 9/455 703/23 |
| 2009/0089622 A1 | 4/2009 | Qi et al. | |
| 2010/0174892 A1 | 7/2010 | Steeb | |
| 2011/0154297 A1* | 6/2011 | Singh | G06F 11/3471 717/130 |
| 2011/0185153 A1* | 7/2011 | Henry | G06F 9/3861 712/30 |
| 2012/0166837 A1* | 6/2012 | Henry | G06F 1/3206 713/321 |
| 2013/0031419 A1* | 1/2013 | Haverkamp | G06F 11/3656 714/45 |
| 2014/0108761 A1 | 4/2014 | Escandell et al. | |
| 2014/0281735 A1 | 9/2014 | Olivarez et al. | |
| 2014/0331211 A1 | 11/2014 | Ma | |
| 2015/0067655 A1 | 3/2015 | Sauzede et al. | |
| 2015/0089645 A1 | 3/2015 | Vandergeest et al. | |
| 2016/0062863 A1 | 3/2016 | Graf | |
| 2016/0231376 A1* | 8/2016 | Kris | G01R 31/2851 |
| 2016/0378626 A1* | 12/2016 | Klazynski | G06F 11/079 714/37 |
| 2017/0062075 A1* | 3/2017 | Barber | G11C 29/12015 |

FOREIGN PATENT DOCUMENTS

| | | |
|---|---|---|
| CN | 101506777 A | 8/2009 |
| CN | 101515251 A | 8/2009 |
| CN | 102073565 A | 5/2011 |
| CN | 101398780 B | 8/2011 |
| CN | 101540706 B | 12/2011 |
| CN | 102346708 A | 2/2012 |
| CN | 101504626 B | 6/2012 |
| CN | 101685420 B | 6/2013 |
| CN | 103226504 A | 7/2013 |
| CN | 103729288 A | 4/2014 |
| CN | 102521087 B | 11/2014 |
| CN | 104750603 A | 7/2015 |
| CN | 105224454 A | 1/2016 |
| EP | 2562650 A1 | 2/2013 |
| WO | 2014166526 A1 | 10/2014 |

OTHER PUBLICATIONS

Bing, X., et al., Multi-port embedded debugger agent for heterogeneous multi-core ASIP debug, 12th IEEE International Conference on Electronic Measurement & Instruments (ICEMI), 2015, pp. 670-673, [retrieved on Aug. 21, 2019], Retrieved from the Internet.*
Lauterbach Development Tools,"Lauterbach and Wind River collaborate to support the full range of Wind River operating systems",dated Feb. 15, 2015,total 1 pages.
DS-5 (ARM Development Studio 5) Development Tools,Retrieved form internet on Apr. 21, 2018,total 7 pages.
Wind River Workbench 3.3,Wind An Intel Company,Retrieved form internet on Apr. 21, 2018,total 3 pages.
Anonymous,"GDB The GNU Project Debugger",Retrieved form Internet on Apr. 21, 2018,total 4 pages.
Lauterbach Development Tools user manual,Retrieved form internet on Apr. 21, 2018,total 1 pages.

* cited by examiner

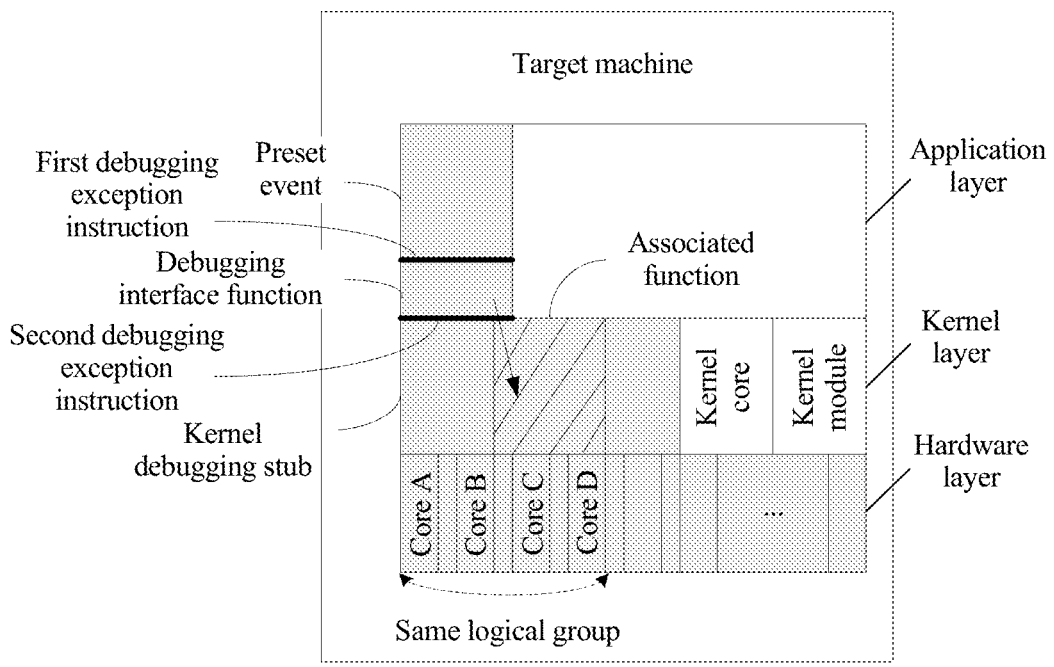
FIG. 5
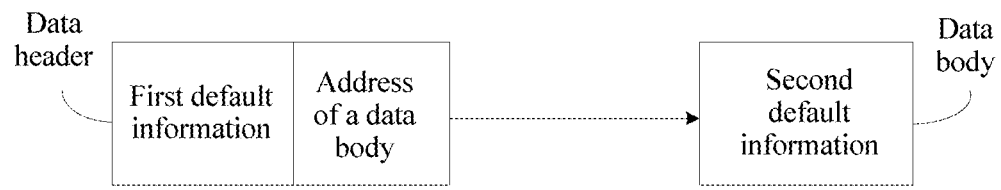
FIG. 6.1
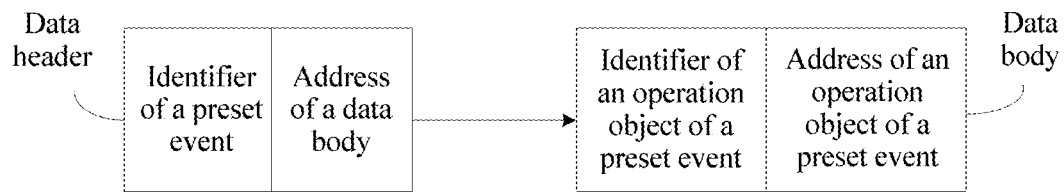
FIG. 6.2

DEBUGGING METHOD, MULTI-CORE PROCESSOR, AND DEBUGGING DEVICE

CROSS-REFERENCE TO RELATED APPLICATIONS

This application is a continuation of International Application No. PCT/CN2016/099996, filed on Sep. 24, 2016, which claims priority to Chinese Patent Application No. 201510623830.4, filed on Sep. 25, 2015. The disclosures of the aforementioned applications are hereby incorporated by reference in their entireties.

TECHNICAL FIELD

Embodiments of the present invention relate to the field of computer technologies, and in particular, to a debugging method, a multi-core processor, and a debugging device.

BACKGROUND

Program debugging is a process in which a compiled computer program is tested manually or by using a method such as a compiling program before being put into actual operation, so as to correct a syntax error and a logic error. This step is indispensable for ensuring correctness of a computer information system. Therefore, the compiled computer program needs to be loaded into a computer for debugging.

Generally, in the industry, code that runs in kernel space is referred to as kernel mode code, and code that runs in user space is referred to as user mode code. Currently, different debugging platforms need to be used to debug the kernel mode code and the user mode code. It should be noted that, a target machine described below refers to a physical host in which a debugged code runs, and a host machine described below refers to a physical host in which a debugger runs. For example, when user mode code is being debugged, a debugger needs to run in an operating system of a target machine to perform local debugging; or when user mode code is being debugged, a process tracing module (Ptrace) needs to be implanted into an operating system of a target machine, a debugging stub may further need to run in the operating system, and then a debugger runs in a host machine to perform remote debugging. When kernel mode code such as a kernel module is being debugged, a kernel debugger needs to be implanted into an operating system of a target machine, and then a debugger runs in a host machine to perform remote debugging.

SUMMARY

Embodiments of the present invention provide a debugging method, a multi-core processor, and a debugging device, so as to debug kernel mode code and user mode code on a same debugging platform.

According to a first aspect, an embodiment of the present invention provides a debugging method, applied to a target machine in a remote debugging system, where the target machine includes a multi-core processor, and the debugging method includes:

stopping running, by a core A of the multi-core processor after completing execution of a processing routine of a preset event, and sending a running stop signal to other cores in a process of stopping running, where the running stop signal is used to instruct the other cores to stop running, the other cores refer to all cores that are located in the multi-core processor and that belong to a same logical group as the core A, and the preset event is a kernel mode code processing function or a user mode code processing function;

after receiving a first stop termination instruction and resuming running, executing, by the core A, a debugging information collection function to collect debugging information of the preset event, and stopping running after completing the execution of the debugging information collection function, where the first stop termination instruction is sent by a debugging apparatus in the remote debugging system after the debugging apparatus determines that the core A stops running and that a reason that the core A stops running is a reason other than the preset event;

after receiving a second stop termination instruction and resuming running, sending, by the core A, a running resumption instruction to the other cores, where the running resumption instruction is used to instruct the other cores to resume running, and the second stop termination instruction is sent by the debugging apparatus after the debugging apparatus sets a preset pending breakpoint as an operation object of the preset event according to the debugging information of the preset event; and knocking, by the core A, the pending breakpoint in a process of running the operation object of the preset event, so as to enter a debugging state.

With reference to the first aspect, in a first implementation manner of the first aspect, the debugging information collection function includes a debugging interface function, a first debugging exception instruction is set in a header of the debugging interface function, and the first debugging exception instruction is used to instruct the core A to stop running; and the stopping running, by the core A after completing execution of a processing routine of a preset event, and sending a running stop signal to other cores in a process of stopping running specifically includes:

after completing the execution of the processing routine of the preset event, starting, by the core A, to execute the first debugging exception instruction located in the header of the debugging interface function, and sending the running stop signal to the other cores in a process of executing the first debugging exception instruction.

With reference to the first implementation manner of the first aspect, in a second implementation manner of the first aspect, the debugging information collection function further includes a function associated with the preset event, a second debugging exception instruction is further set in a trailer of the debugging interface function, and the second debugging exception instruction is used to instruct the core A to stop running; and the executing, by the core A, a debugging information collection function to collect debugging information of the preset event, and stopping running after completing the execution of the debugging information collection function specifically includes:

executing, by the core A, the function associated with the preset event to collect the debugging information of the preset event, and then executing the second debugging exception instruction located in the trailer of the debugging interface function.

With reference to the second implementation manner of the first aspect, in a third implementation manner of the first aspect, the function associated with the preset event is located in a kernel debugging stub, and the kernel debugging stub is implanted into an operating system of the target machine in advance.

With reference to any one of the first aspect, or the first implementation manner of the first aspect to the third implementation manner of the first aspect, in a fourth implementation manner of the first aspect, the kernel mode code processing function is a kernel module loading function; and the user mode code processing function is a process creation function, a process switching function, a process blocking function, a process wakeup function, a thread creation function, a thread switching function, a thread blocking function, or a thread wakeup function.

With reference to the fourth implementation manner of the first aspect, in a fifth implementation manner of the first aspect, if the preset event is the kernel module loading function, the operation object of the preset event is a kernel module;

if the preset event is the process creation function, the process switching function, the process blocking function, or the process wakeup function, the operation object of the preset event is a process; and if the preset event is the thread creation function, the thread switching function, the thread blocking function, or the thread wakeup function, the operation object of the preset event is a thread.

With reference to the fourth implementation manner of the first aspect or the fifth implementation manner of the first aspect, in a sixth implementation manner of the first aspect, the debugging information of the preset event includes an identifier of the operation object of the preset event; and if the preset event is the kernel module loading function, the process creation function, or the thread creation function, the debugging information of the preset event further includes a loading address of the operation object of the preset event.

With reference to any one of the first aspect, or the first implementation manner of the first aspect to the sixth implementation manner of the first aspect, in a seventh implementation manner of the first aspect, the multi-core processor is integrated into a system on chip SOC;

the sending, by a core A, a running stop signal to other cores, where the running stop signal is used to instruct the other cores to stop running specifically includes:

sending, by the core A, the running stop signal to the other cores by using a hardware cross-trigger network of the SOC, where the running stop signal is used to instruct the other cores to stop running; and the sending, by the core A, a running resumption instruction to the other cores, where the running resumption instruction is used to instruct the other cores to resume running specifically includes:

sending, by the core A, the running resumption instruction to the other cores by using the hardware cross-trigger network of the SOC, where the running resumption instruction is used to instruct the other cores to resume running.

According to a second aspect, an embodiment of the present invention provides a debugging method, executed by a debugging apparatus deployed in a host machine, where the host machine is located in a remote debugging system, and the method includes:

determining, by the debugging apparatus after determining that a core A stops running, a reason that the core A stops running, where the core A belongs to a multi-core processor of a target machine in the remote debugging system;

if the reason that the core A stops running is a preset event, obtaining, by the debugging apparatus, debugging information of the preset event, and setting a preset pending breakpoint as an operation object of the preset event according to the debugging information of the preset event, where the preset event is a kernel mode code processing function or a user mode code processing function, and the operation object of the preset event is kernel mode code or user mode code; and instructing, by the debugging apparatus, the core A to resume running, so that the core A knocks the pending breakpoint in a process of running the operation object of the preset event, and the core A enters a debugging state.

With reference to the second aspect, in a first implementation manner of the second aspect, the method further includes:

if the reason that the core A stops running is a reason other than the preset event, instructing, by the debugging apparatus, the core A to resume running, to collect the debugging information of the preset event.

With reference to the second aspect or the first implementation manner of the second aspect, in a second implementation manner of the second aspect, the function of the kernel mode code is a kernel module loading function; and the function of the user mode code is a process creation function, a process switching function, a process blocking function, a process wakeup function, a thread creation function, a thread switching function, a thread blocking function, or a thread wakeup function.

With reference to the second implementation manner of the second aspect, in a third implementation manner of the second aspect, if the preset event is the kernel module loading function, the process creation function, or the thread creation function, the debugging information of the preset event includes a loading address of the operation object of the preset event; and the obtaining, by the debugging apparatus, debugging information of the preset event, and setting a preset pending breakpoint as an operation object of the preset event according to the debugging information of the preset event specifically includes:

obtaining, by the debugging apparatus, the loading address of the operation object of the preset event, and setting the preset pending breakpoint as a destination address of the operation object of the preset event according to the loading address of the operation object of the preset event.

With reference to the second implementation manner of the second aspect, in a fourth implementation manner of the second aspect, if the preset event is the process switching function, the process blocking function, the process wakeup function, the thread switching function, the thread blocking function, or the thread wakeup function, the debugging information of the preset event includes an identifier of the operation object of the preset event; and the obtaining, by the debugging apparatus, debugging information of the preset event, and setting a preset pending breakpoint as an operation object of the preset event according to the debugging information of the preset event specifically includes:

obtaining, by the debugging apparatus, the identifier of the operation object of the preset event, determining a loading address of the operation object of the preset event according to the identifier of the operation object of the preset event, and setting the preset pending breakpoint as a destination address of the operation object of the preset event according to the loading address of the operation object of the preset event.

With reference to the fourth implementation manner of the second aspect, in a fifth implementation manner of the second aspect, a correspondence between the identifier of the operation object of the preset event and the loading address of the operation object of the preset event is pre-stored in storage space of the host machine; and the determining a loading address of the operation object of the preset event according to the identifier of the operation object of the preset event specifically includes:

obtaining, from the storage space of the host machine, the loading address of the operation object of the preset event according to the identifier of the operation object of the preset event and the correspondence.

With reference to any one of the second aspect, or the first implementation manner of the second aspect to the fifth implementation manner of the second aspect, in a sixth implementation manner of the second aspect, the debugging apparatus includes a debugger and a debugging agent;

the determining, by the debugging apparatus after determining that a core A stops running, a reason that the core A stops running, and if the reason that the core A stops running is a preset event, obtaining, by the debugging apparatus, debugging information of the preset event, and setting a preset pending breakpoint as an operation object of the preset event according to the debugging information of the preset event specifically includes:

after determining, in a polling manner, that the core A stops running, determining, by the debugging agent, the reason that the core A stops running, and if the reason that the core A stops running is the preset event, reporting, by the debugging agent, a second message to the debugger, where the second message includes an identifier indicating that the core A stops running and an identifier of the preset event; and after receiving the second message, obtaining, by the debugger, the debugging information of the preset event according to the identifier of the preset event, and setting the preset pending breakpoint as the operation object of the preset event according to the debugging information of the preset event; and the instructing, by the debugging apparatus, the core A to resume running specifically includes:

instructing, by the debugger, the debugging agent to send a second stop termination instruction to the core A, where the second stop termination instruction is used to instruct the core A to resume running.

With reference to the sixth implementation manner of the second aspect, in a seventh implementation manner of the second aspect, the determining, by the debugging apparatus after determining that a core A stops running, a reason that the core A stops running, and if the reason that the core A stops running is a reason other than the preset event, instructing, by the debugging apparatus, the core A to resume running, to collect the debugging information of the preset event specifically includes:

after determining, in a polling manner, that the core A stops running, determining, by the debugging agent, the reason that the core A stops running, and if the reason that the core A stops running is a reason other than the preset event, sending, by the debugging agent, a first stop termination instruction to the core A, where the first stop termination instruction is used to instruct the core A to resume running, to collect the debugging information of the preset event.

With reference to any one of the second aspect, or the first implementation manner of the second aspect to the sixth implementation manner of the second aspect, in an eighth implementation manner of the second aspect, the debugging apparatus includes the debugger and the debugging agent; and the determining, by the debugging apparatus after determining that a core A stops running, a reason that the core A stops running, and if the reason that the core A stops running is a reason other than the preset event, instructing, by the debugging apparatus, the core A to resume running, to collect the debugging information of the preset event specifically includes:

after determining, in a polling manner, that the core A stops running, determining, by the debugging agent, the reason that the core A stops running, and if the reason that the core A stops running is a reason other than the preset event, reporting a first message to the debugger, where the first message includes the identifier indicating that the core A stops running and a default identifier; and after receiving the first message, instructing, by the debugger, the debugging agent to send a first stop termination instruction to the core A, where the first stop termination instruction is used to instruct the core A to resume running, to collect the debugging information of the preset event.

With reference to any one of the second aspect, or the first implementation manner of the second aspect to the eighth implementation manner of the second aspect, in a ninth implementation manner of the second aspect, if the preset event is the kernel module loading function, the operation object of the preset event is a kernel module;

if the preset event is the process creation function, the process switching function, the process blocking function, or the process wakeup function, the operation object of the preset event is a process; and if the preset event is the thread creation function, the thread switching function, the thread blocking function, or the thread wakeup function, the operation object of the preset event is a thread.

According to a third aspect, an embodiment of the present invention provides a multi-core processor, applied to a target machine in a remote debugging system, where the multi-core processor includes a core A, other cores, and an input port, and the other cores refer to all cores that are located in the multi-core processor and that belong to a same logical group as the core A, where the core A is configured to: stop running after completing execution of a processing routine of a preset event, and send a running stop signal to the other cores in a process of stopping running, where the running stop signal is used to instruct the other cores to stop running, and the preset event is a kernel mode code processing function or a user mode code processing function;

the input port is configured to: receive a first stop termination instruction, and forward the first stop termination instruction to the core A, where the first stop termination instruction is sent by a debugging apparatus in the remote debugging system after the debugging apparatus determines that the core A stops running and that a reason that the core A stops running is a reason other than the preset event;

the core A is further configured to: after receiving the first stop termination instruction and resuming running, execute a debugging information collection function to collect debugging information of the preset event, and stop running after completing the execution of the debugging information collection function;

the input port is further configured to: receive a second stop termination instruction, and forward the second stop termination instruction to the core A, where the second stop termination instruction is sent by the debugging apparatus after the debugging apparatus sets a preset pending breakpoint as an operation object of the preset event according to the debugging information of the preset event; and the core A is further configured to: send a running resumption instruction to the other cores after receiving the second stop termination instruction and resuming running, where the running resumption instruction is used to instruct the other cores to resume running; and knock the pending breakpoint in a process of running the operation object of the preset event, so as to enter a debugging state.

With reference to the third aspect, in a first implementation manner of the third aspect, the debugging information collection function includes a debugging interface function, a first debugging exception instruction is set in a header of the debugging interface function, and the first debugging exception instruction is used to instruct the core A to stop running; and the core A is specifically configured to: after completing the execution of the processing routine of the preset event, start to execute the first debugging exception instruction located in the header of the debugging interface function, and send the running stop signal to the other cores in a process of executing the first debugging exception instruction.

With reference to the first implementation manner of the third aspect, in a second implementation manner of the third aspect, the debugging information collection function further includes a function associated with the preset event, a second debugging exception instruction is further set in a trailer of the debugging interface function, and the second debugging exception instruction is used to instruct the core A to stop running; and the core A is specifically configured to: execute the function associated with the preset event to collect the debugging information of the preset event, and then execute the second debugging exception instruction located in the trailer of the debugging interface function.

With reference to the second implementation manner of the third aspect, in a third implementation manner of the third aspect, the function associated with the preset event is located in a kernel debugging stub, and the kernel debugging stub is implanted into an operating system of the target machine in advance.

With reference to any one of the third aspect, or the first implementation manner of the third aspect to the third implementation manner of the third aspect, in a fourth implementation manner of the third aspect, the kernel mode code processing function is a kernel module loading function; and the user mode code processing function is a process creation function, a process switching function, a process blocking function, a process wakeup function, a thread creation function, a thread switching function, a thread blocking function, or a thread wakeup function.

With reference to the fourth implementation manner of the third aspect, in a fifth implementation manner of the third aspect, if the preset event is the kernel module loading function, the operation object of the preset event is a kernel module;

if the preset event is the process creation function, the process switching function, the process blocking function, or the process wakeup function, the operation object of the preset event is a process; and if the preset event is the thread creation function, the thread switching function, the thread blocking function, or the thread wakeup function, the operation object of the preset event is a thread.

With reference to the fourth implementation manner of the third aspect or the fifth implementation manner of the third aspect, in a sixth implementation manner of the third aspect, the debugging information of the preset event includes an identifier of the operation object of the preset event; and if the preset event is the kernel module loading function, the process creation function, or the thread creation function, the debugging information of the preset event further includes a loading address of the operation object of the preset event.

With reference to any one of the third aspect, or the first implementation manner of the third aspect to the sixth implementation manner of the third aspect, in a seventh implementation manner of the third aspect, the multi-core processor is integrated into a system on chip SOC;

the core A is specifically configured to send the running stop signal to the other cores by using a hardware cross-trigger network of the SOC, where the running stop signal is used to instruct the other cores to stop running; and the core A is specifically configured to send the running resumption instruction to the other cores by using the hardware cross-trigger network of the SOC, where the running resumption instruction is used to instruct the other cores to resume running.

According to a fourth aspect, an embodiment of the present invention provides a debugging apparatus, where the debugging device is deployed on a host machine in a remote debugging system, and the debugging device includes a debugging unit and a receiving unit, where the receiving unit is configured to: receive a message used for instructing a core A to stop running, and forward the message used for instructing the core A to stop running to the debugging unit, where a target machine located in the remote debugging system includes a multi-core processor, and the multi-core processor includes the core A;

the debugging unit is configured to: after determining that the core A stops running, determine a reason that the core A stops running;

if the reason that the core A stops running is a preset event, the debugging unit is further configured to: obtain debugging information of the preset event, and set a preset pending breakpoint as an operation object of the preset event according to the debugging information of the preset event, where the preset event is a kernel mode code processing function or a user mode code processing function, and the operation object of the preset event is kernel mode code or user mode code; and the debugging unit is further configured to instruct the core A to resume running, so that the core A knocks the pending breakpoint in a process of running the operation object of the preset event, and the core A enters a debugging state.

With reference to the fourth aspect, in a first implementation manner of the fourth aspect, if the reason that the core A stops running is a reason other than the preset event, the debugging unit is further configured to instruct the core A to resume running, to collect the debugging information of the preset event.

With reference to the fourth aspect or the first implementation manner of the fourth aspect, in a second implementation manner of the fourth aspect, the function of the kernel mode code is a kernel module loading function; and the function of the user mode code is a process creation function, a process switching function, a process blocking function, a process wakeup function, a thread creation function, a thread switching function, a thread blocking function, or a thread wakeup function.

With reference to the second implementation manner of the fourth aspect, in a third implementation manner of the fourth aspect, if the preset event is the kernel module loading function, the process creation function, or the thread creation function, the debugging information of the preset event includes a loading address of the operation object of the preset event; and the debugging unit is specifically configured to: obtain the loading address of the operation object of the preset event, and set the preset pending breakpoint as a destination address of the operation object of the preset event according to the loading address of the operation object of the preset event.

With reference to the second implementation manner of the fourth aspect, in a fourth implementation manner of the fourth aspect, if the preset event is the process switching function, the process blocking function, the process wakeup function, the thread switching function, the thread blocking function, or the thread wakeup function, the debugging information of the preset event includes an identifier of the operation object of the preset event; and the debugging unit is specifically configured to: obtain the identifier of the operation object of the preset event, determine a loading address of the operation object of the preset event according to the identifier of the operation object of the preset event, and set the preset pending breakpoint as a destination address of the operation object of the preset event according to the loading address of the operation object of the preset event.

With reference to the fourth implementation manner of the fourth aspect, in a fifth implementation manner of the fourth aspect, a correspondence between the identifier of the operation object of the preset event and the loading address of the operation object of the preset event is pre-stored in storage space of the host machine; and the debugging unit is specifically configured to obtain, from the storage space of the host machine, the loading address of the operation object of the preset event according to the identifier of the operation object of the preset event and the correspondence.

With reference to any one of the fourth aspect, or the first implementation manner of the fourth aspect to the fifth implementation manner of the fourth aspect, in a sixth implementation manner of the fourth aspect, the debugging unit includes a debugger and a debugging agent;

the debugging agent is specifically configured to: after determining that the core A stops running, determine the reason that the core A stops running, and if the reason that the core A stops running is the preset event, report a second message to the debugger, where the second message includes an identifier indicating that the core A stops running and an identifier of the preset event;

the debugger is specifically configured to: after receiving the second message, obtain the debugging information of the preset event according to the identifier of the preset event, and set the preset pending breakpoint as the operation object of the preset event according to the debugging information of the preset event; and the debugger is specifically configured to instruct the debugging agent to send a second stop termination instruction to the core A, where the second stop termination instruction is used to instruct the core A to resume running.

With reference to the sixth implementation manner of the fourth aspect, in a seventh implementation manner of the fourth aspect, the debugging agent is specifically configured to: after determining that the core A stops running, determine the reason that the core A stops running, and if the reason that the core A stops running is a reason other than the preset event, send a first stop termination instruction to the core A, where the first stop termination instruction is used to instruct the core A to resume running, to collect the debugging information of the preset event.

With reference to any one of the fourth aspect, or the first implementation manner of the fourth aspect to the sixth implementation manner of the fourth aspect, in an eighth implementation manner of the fourth aspect, the debugging apparatus further includes the debugger and the debugging agent;

the debugging agent is specifically configured to: after determining that the core A stops running, determine the reason that the core A stops running, and if the reason that the core A stops running is a reason other than the preset event, report a first message to the debugger, where the first message includes the identifier indicating that the core A stops running and a default identifier; and the debugger is specifically configured to: after receiving the first message, instruct the debugging agent to send a first stop termination instruction to the core A, where the first stop termination instruction is used to instruct the core A to resume running, to collect the debugging information of the preset event.

According to a fifth aspect, an embodiment of the present invention provides a debugging device, including a processor and a memory, where the processor is configured to: after determining that the core A stops running, determine a reason that the core A stops running, where a target machine located in the remote debugging system includes a multi-core processor, and the multi-core processor includes the core A;

if the reason that the core A stops running is a preset event, the processor is further configured to: obtain debugging information of the preset event, and set a preset pending breakpoint as an operation object of the preset event according to the debugging information of the preset event, where the preset event is a kernel mode code processing function or a user mode code processing function, and the operation object of the preset event is kernel mode code or user mode code;

the memory is configured to store the debugging information of the preset event; and the processor is further configured to instruct the core A to resume running, so that the core A knocks the pending breakpoint in a process of running the operation object of the preset event, and the core A enters a debugging state.

With reference to the fifth aspect, in a first implementation manner of the fifth aspect, if the reason that the core A stops running is a reason other than the preset event, the processor is further configured to instruct the core A to resume running, to collect the debugging information of the preset event.

With reference to the fifth aspect or the first implementation manner of the fifth aspect, in a second implementation manner of the fifth aspect, the function of the kernel mode code is a kernel module loading function; and the function of the user mode code is a process creation function, a process switching function, a process blocking function, a process wakeup function, a thread creation function, a thread switching function, a thread blocking function, or a thread wakeup function.

With reference to the second implementation manner of the fifth aspect, in a third implementation manner of the fifth aspect, if the preset event is the kernel module loading function, the process creation function, or the thread creation function, the debugging information of the preset event includes a loading address of the operation object of the preset event; and the processor is specifically configured to: obtain the loading address of the operation object of the preset event, and set the preset pending breakpoint as a destination address of the operation object of the preset event according to the loading address of the operation object of the preset event.

With reference to the second implementation manner of the fifth aspect, in a fourth implementation manner of the fifth aspect, if the preset event is the process switching function, the process blocking function, the process wakeup function, the thread switching function, the thread blocking function, or the thread wakeup function, the debugging information of the preset event includes an identifier of the operation object of the preset event; and the processor is specifically configured to: obtain the identifier of the operation object of the preset event, determine a loading address of the operation object of the preset event according to the identifier of the operation object of the preset event, and set the preset pending breakpoint as a destination address of the operation object of the preset event according to the loading address of the operation object of the preset event.

With reference to the fourth implementation manner of the fifth aspect, in a fifth implementation manner of the fifth aspect, a correspondence between the identifier of the operation object of the preset event and the loading address of the operation object of the preset event is pre-stored in storage space of the host machine; and the processor is specifically configured to obtain, from the storage space of the host machine, the loading address of the operation object of the preset event according to the identifier of the operation object of the preset event and the correspondence.

It can be learned that according to the debugging method provided in the embodiments of the present invention, a debugging interface function is added to a trailer of a preset event that runs on a core A. The debugging interface function invokes a function that is associated with a type of the preset event and that is in a kernel debugging stub, to obtain debugging information of the preset event. A debugger sets a preset pending breakpoint as a destination address of an operation object of the preset event according to the debugging information of the preset event, so that the core A knocks the pending breakpoint in a subsequent process of running the operation object of the preset event, so as to enter a debugging state. In the embodiments of the present invention, the preset event is a kernel mode code processing function or a user mode code processing function. Therefore, according to the technical solutions provided in the embodiments of the present invention, kernel mode code and user mode code can be debugged on a same debugging platform.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 5 is a schematic structural diagram of a target machine according to an embodiment of the present invention;

FIG. 6.1 is a schematic structural diagram of a data header and a data body according to an embodiment of the present invention;

FIG. 6.2 is another schematic structural diagram of a data header and a data body according to an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Embodiment 1

Figure 1:
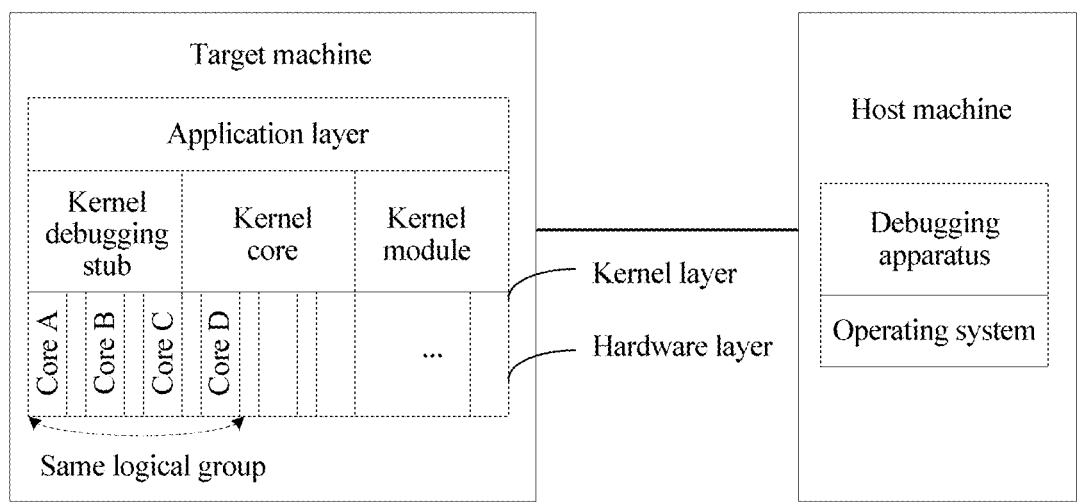
FIG. 1 is a schematic structural diagram of a remote debugging system according to an embodiment of the present invention.

This embodiment of the present invention provides a debugging method applied to a remote debugging system shown in FIG. 1. Referring to FIG. 1, the remote debugging system includes a target machine and a host machine, the target machine includes a multi-core processor, and a debugging apparatus is deployed on the host machine. The target machine and the host machine are different physical hosts, and the target machine communicates with and connects to the host machine. It should be noted that, in the technical solution provided in this embodiment of the present invention, the multi-core processor may be a homogeneous multi-core processor, or may be a heterogeneous multi-core processor. If the target machine includes multiple multi-core processors, a core A may be any core of any multi-core processor in the target machine, instead of a specific core of a specific multi-core processor in the target machine.

Figure 3:
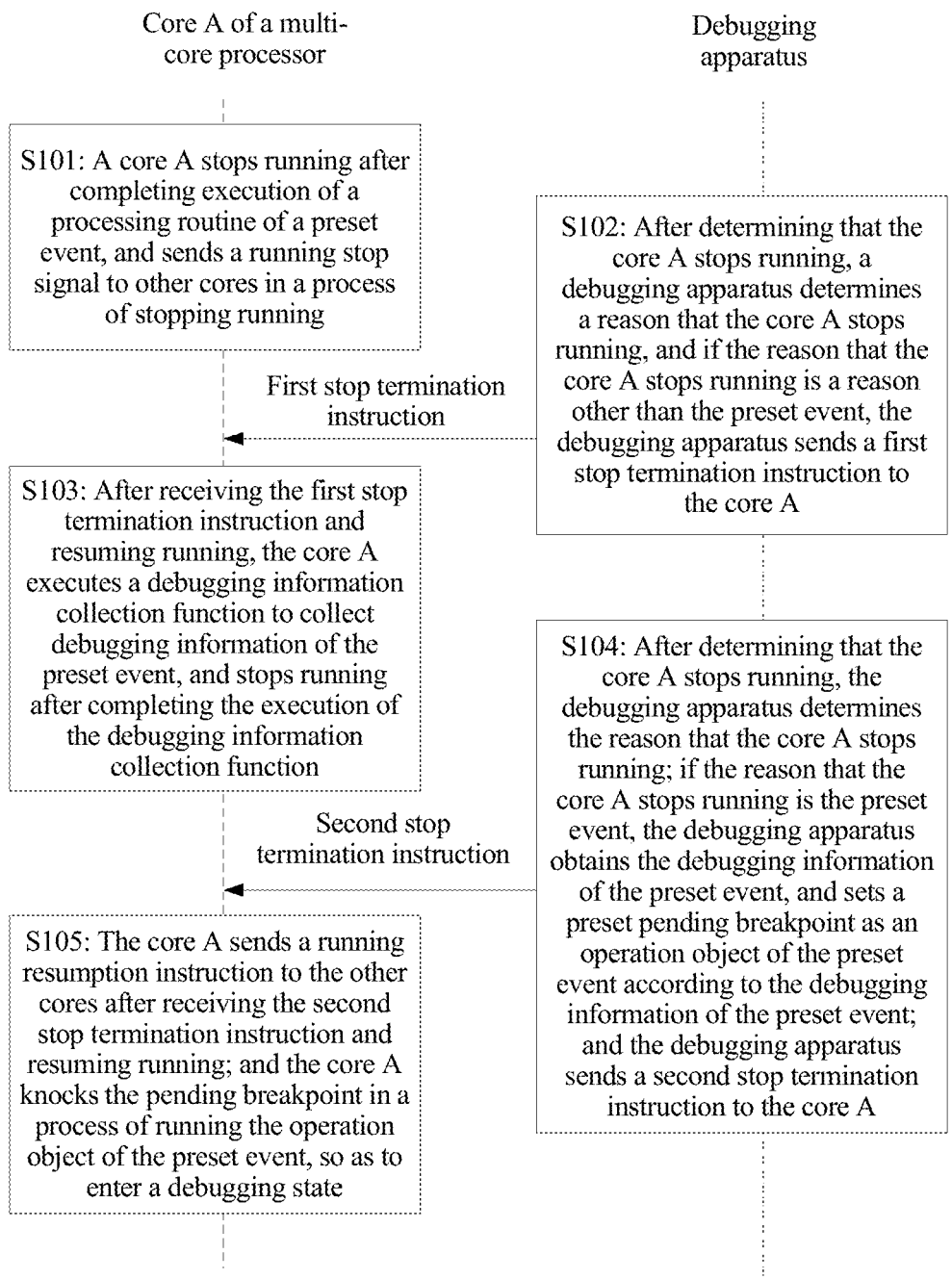
FIG. 3 is a schematic flowchart of a debugging method according to an embodiment of the present invention.

The debugging method provided in this embodiment of the present invention is a cross debugging method, and is a system-level debugging method. Referring to FIG. 3, the debugging method provided in this embodiment of the present invention includes the following steps.

S101. The core A stops running after completing execution of a processing routine of a preset event, and sends a running stop signal to other cores in a process of stopping running, where the running stop signal is used to instruct the other cores to stop running, the other cores refer to all cores that are located in the multi-core processor and that belong to a same logical group as the core A, and the preset event is a kernel mode code processing function or a user mode code processing function.

As shown in FIG. 5, in this embodiment of the present invention, a debugging interface function is added to a trailer of the preset event. The debugging interface function is located outside the preset event, and is not a part of the preset event. A first debugging exception instruction is set in a header of the debugging interface function, and the core A stops running after completing execution of the first debugging exception instruction. A second debugging exception instruction is further set in a trailer of the debugging interface function, and the core A stops running after completing execution of the second debugging exception instruction.

Specifically, that the core A stops running after completing execution of a processing routine of a preset event, and sends a running stop signal to other cores in a process of stopping running includes: after completing the execution of the processing routine of the preset event, the core A starts to execute the first debugging exception instruction located in the header of the debugging interface function, and sends the running stop signal to the other cores in a process of executing the first debugging exception instruction. It should be noted that, the core A executes the first debugging exception instruction for a period of time. The core A first starts to execute the first debugging exception instruction, then sends the running stop signal to the other cores at a moment before the execution of the first debugging exception instruction is completed, and continues to execute the first debugging exception instruction after sending the running stop signal to the other cores. The core A stops running after completing execution of the first debugging exception instruction.

It should be noted that, all cores included in a same logical group are located in a same multi-core processor. Logical grouping means that multiple cores in a service association relationship are classified into a same logical group by a debugging engineer according to experience. As shown in FIG. 1, the core A, a core B, a core C, and a core D are located in a same logical group. In this case, that the core A sends a running stop signal to other cores is specifically: the core A sends the running stop signal to the core B, the core C, and the core D.

In an embodiment of the present invention, if the target machine includes a system on chip SOC, and the multi-core processor including the core A is integrated into the SOC, that the core A sends a running stop signal to other cores, where the running stop signal is used to instruct the other cores to stop running is specifically: the core A sends the running stop signal to the other cores by using a hardware cross-trigger network of the SOC, where the running stop signal is used to instruct the other cores to stop running. It should be noted that, when sending a running resumption instruction to the other cores by using the hardware cross-trigger network of the SOC, the core A sends the running resumption instruction in a broadcast form. An advantage of transmitting a signal by using the hardware cross-trigger network of the system on chip SOC lies in: compared with transmitting a signal by using software, transmitting a signal by using hardware can improve time validity of transmission of the running stop signal.

It should be noted that, generally, in the industry, code that runs in kernel space is referred to as kernel mode code, and code that runs in user space is referred to as user mode code. The kernel mode code processing function is a kernel module loading function; and the user mode code processing function is a process creation function, a process switching function, a process blocking function, a process wakeup function, a thread creation function, a thread switching function, a thread blocking function, or a thread wakeup function. It is easily learned that regardless of multiple processes or multiple threads that run on a heterogeneous multi-core processor in an asymmetric multi-processing (AMP, asymmetric multi-processing) structure, or multiple processes or multiple threads that run on a homogeneous multi-core processor in a symmetric multi-processing (SMP, symmetric multi-processing) structure, synchronous debugging can be implemented by using the technical solution provided in this embodiment of the present invention.

S102. After determining that the core A stops running, the debugging apparatus determines a reason that the core A stops running, and if the reason that the core A stops running is a reason other than the preset event, the debugging apparatus sends a first stop termination instruction to the core A, where the first stop termination instruction is used to instruct the core A to resume running.

It should be noted that, in step S101, the core A stops running after completing the execution of the processing routine of the preset event, and instructs the other cores to stop running; in step S102, the debugging apparatus sends the first stop termination instruction to the core A. Such a solution is designed to implement synchronous debugging. Referring to FIG. 1, the core A, the core B, the core C, and the core D are located in the same logical group. Data exchange is performed between code that runs on at least one core (such as the core B) of the core B, the core C, or the core D and code that runs on the core A. In this case, during debugging of the core A, if the core B continues to run, distortion may occur because data exchange cannot be correctly performed between the code that runs on the core B and the code that runs on the core A. Therefore, in the solution provided in this embodiment of the present invention, during debugging of the core A, the other cores that belong to the same logical group as the core A stop running, to avoid distortion. Further, the core A and the other cores first synchronously stop running, and then the core A resumes running for debugging. In addition, in order that the core A and the other cores synchronously stop running, a time at which the running stop signal sent by the core A is transmitted to the other cores and a time at which the core A stops running are further fully considered in design of the solution. Specifically, after stopping running, the core A sends a running stop instruction to the other cores in a running stop period, so that the core A and the other cores synchronously stop running, thereby implementing relatively precise synchronous debugging.

It should be noted that, there is preset storage space in a memory of the target machine, the preset storage space is specified by a debugging engineer in the memory of the target machine in advance, and both a size and an address of the preset storage space are fixed. The preset storage space is used to store a data header. Initially, the data header includes first default information and an address of a data body, and certainly, the first default information may be empty. The data body includes second default information, and certainly, the second default information may also be empty.

As shown in FIG. 6.1, if the core A stops running after completing the execution of the operation routine of the preset event, the data header still includes the first default information and a location of the data body, and content of the data body is the second default information. Correspondingly, if the core A stops running after completing the execution of the operation routine of the preset event, that after determining that the core A stops running, the debugging apparatus determines a reason that the core A stops running in S102 specifically includes: after determining, in a polling manner, that the core A stops running, the debugging apparatus determines, by reading content of the data header, the reason that the core A stops running. Because the content of the data header includes the first default information, the debugging apparatus can determine, according to the first default information, that the reason that the core A stops running is a reason other than the preset event.

Figure 2:
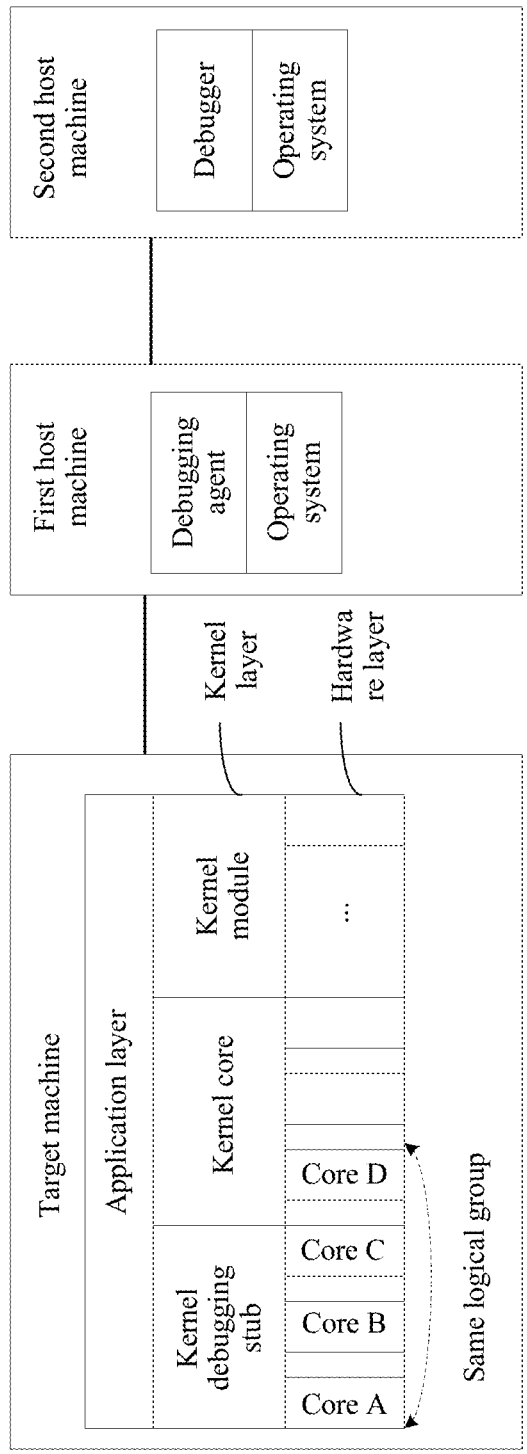
FIG. 2 is a schematic structural diagram of another remote debugging system according to an embodiment of the present invention.
Figure 4A:
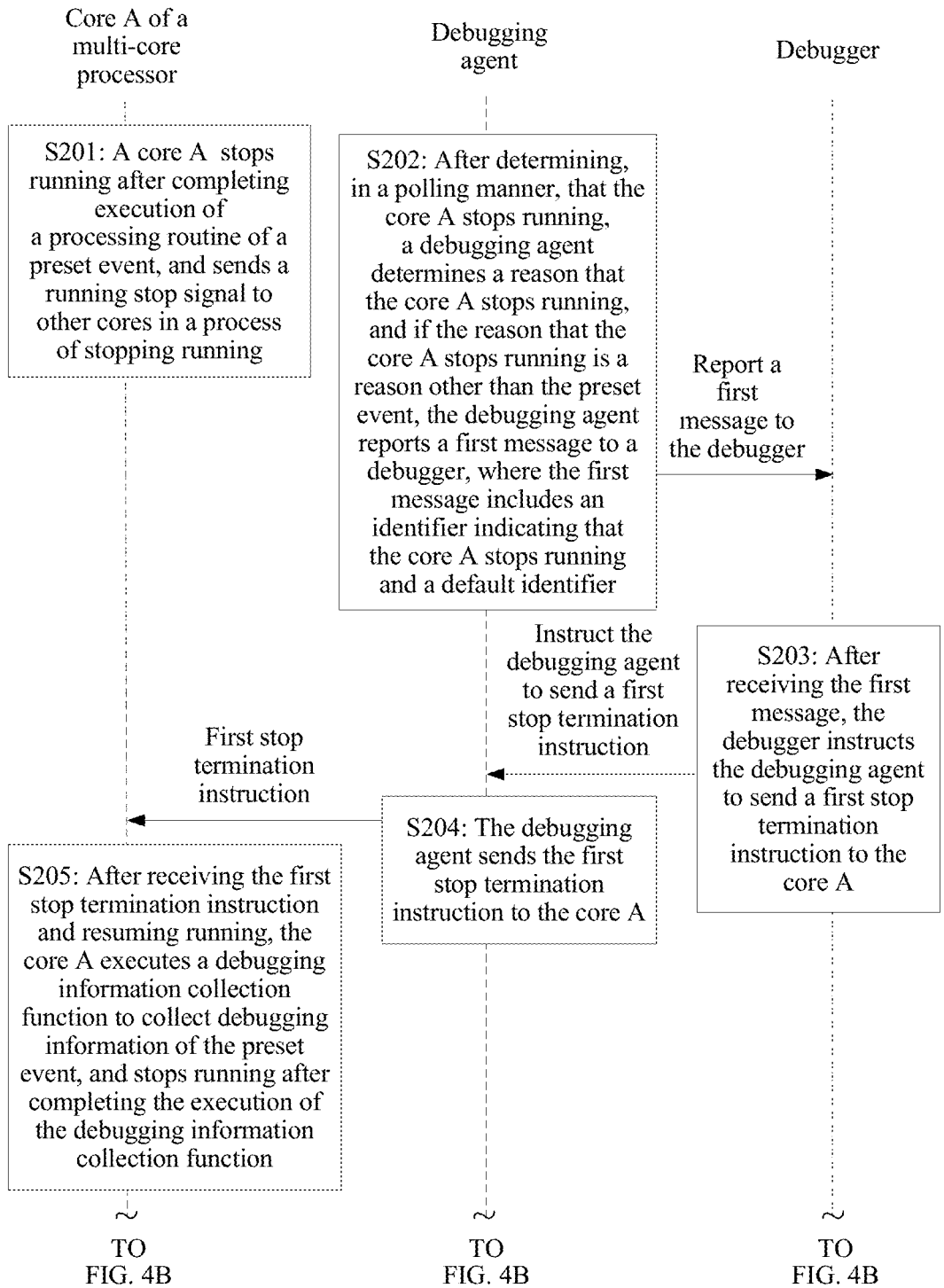
FIG. 4A and FIG. 4B are a schematic flowchart of another debugging method according to an embodiment of the present invention.
Figure 4B:
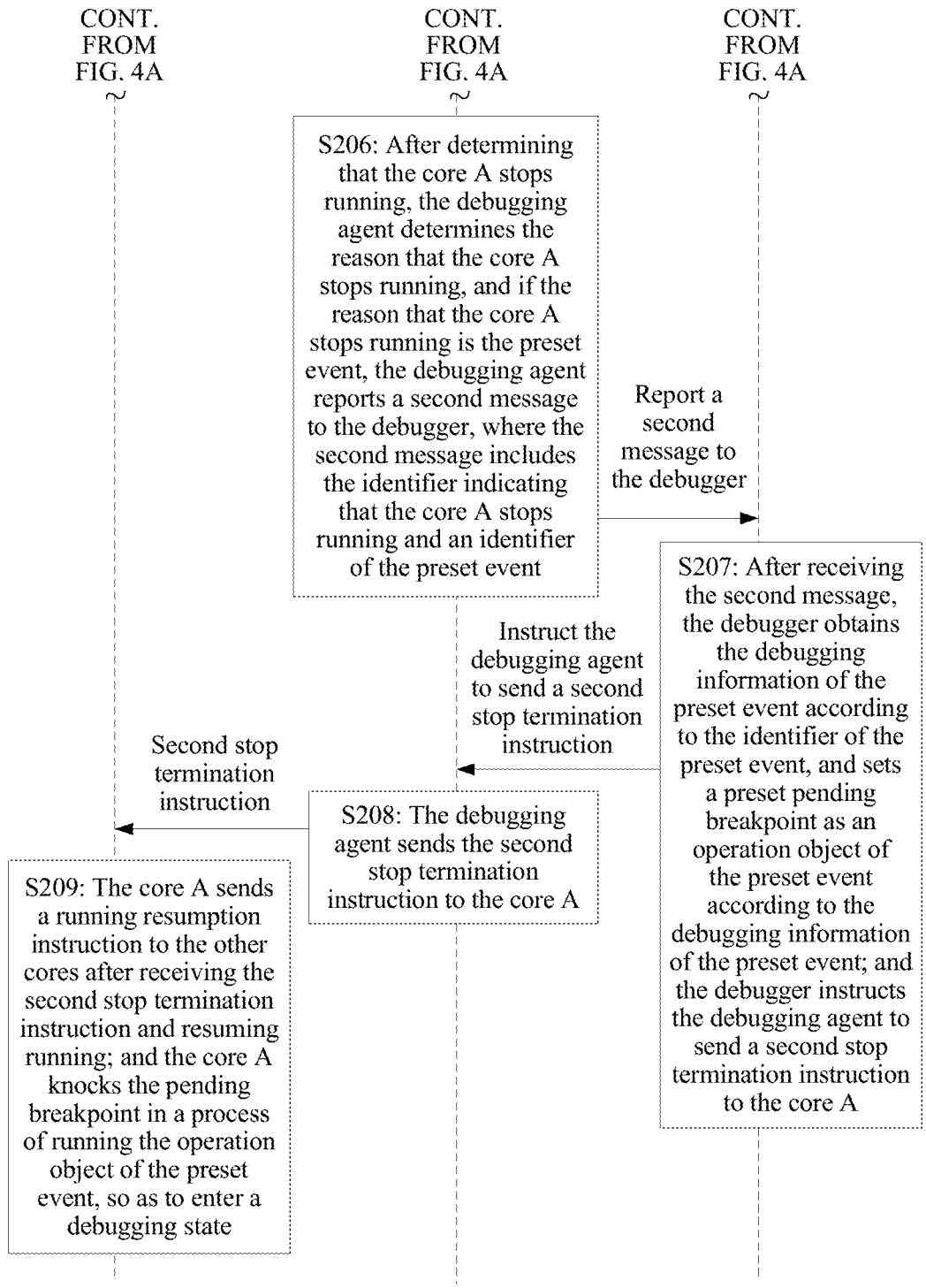

Referring to FIG. 4A and FIG. 4B, in an embodiment of the present invention, the debugging apparatus includes a debugging agent and a debugger, and the debugging apparatus is applied to the remote debugging system described in FIG. 2. It should be noted that, the debugging agent and the debugger may be located in a same host machine, or may be located in different host machines. For example, in FIG. 2, the debugging agent is located in a first host machine, and the debugger is located in a second host machine. As shown in FIG. 4A, if the debugging apparatus includes the debugging agent and the debugger, S102 in FIG. 3 specifically includes the following steps.

S202. After determining, in a polling manner, that the core A stops running, the debugging agent determines the reason that the core A stops running, and if the reason that the core A stops running is a reason other than the preset event, the debugging agent reports a first message to the debugger, where the first message includes an identifier indicating that the core A stops running and a default identifier.

With reference to content explained in detail above, if the core A stops running after completing the execution of the operation routine of the preset event, it can be learned that S202 specifically includes: after determining, in a polling manner, that the core A stops running, the debugging agent determines, by reading the content of the data header, the reason that the core A stops running. Because the content of the data header includes the first default information, the debugging agent can determine, according to the first default information, that the reason that the core A stops running is a reason other than the preset event, and report, to the debugger, the first message including the identifier indicating that the core A stops running and the default identifier.

S203. After receiving the first message, the debugger instructs the debugging agent to send the first stop termination instruction to the core A, where the first stop termination instruction is used to instruct the core A to resume running.

S204. The debugging agent sends the first stop termination instruction to the core A.

In an embodiment of the present invention, if the debugging apparatus includes the debugging agent and the debugger, S102 in FIG. 3 specifically includes:

after determining, in a polling manner, that the core A stops running, the debugging agent determines the reason that the core A stops running, and if the reason that the core A stops running is a reason other than the preset event, the debugging agent sends the first stop termination instruction to the core A, where the first stop termination instruction is used to instruct the core A to resume running.

For details, refer to the foregoing explanation of step S402. Details are not described herein again. It should be noted that, in this embodiment of the present invention, the debugging agent no longer reports, to the debugger, the first message including the identifier indicating that the core A stops running and the default identifier. Instead, the debugging agent sends the first stop termination instruction to the core A after reading the first default information from the data header and determining that the reason that the core A stops running is a reason other than the preset event. A difference between this embodiment and the foregoing embodiment lies in: the debugging agent sends the first stop termination instruction to the core A because the debugging agent determines that the reason that the core A stops running is a reason other than the preset event, instead of receiving an instruction of the debugger. Compared with the foregoing embodiment, the debugging agent shares more work of the debugger in this embodiment. Therefore, fewer function requirements are imposed on the debugger, which helps to simplify the debugger.

S103. After receiving the first stop termination instruction and resuming running, the core A executes a debugging information collection function to collect debugging information of the preset event, and stops running after completing the execution of the debugging information collection function.

Referring to FIG. 5, it should be noted that, the debugging information collection function includes the debugging interface function added to the trailer of the preset event and a function associated with the preset event. The function associated with the preset event is located in a kernel debugging stub, and the kernel debugging stub is implanted into an operating system of the target machine in advance.

As described for S101 in detail above, the first debugging exception instruction is set in the header of the debugging interface function, and the second debugging exception instruction is set in the trailer of the debugging interface function. In a process of executing the debugging interface function, the function that is associated with the preset event and that is located in the kernel debugging stub is invoked.

Specifically, S103 includes: the core A executes the function associated with the preset event to collect the debugging information of the preset event, and then executes the second debugging exception instruction located in the trailer of the debugging interface function. The core A stops running after the core A completes the execution of the second debugging exception instruction.

It should be noted that, the debugging information of the preset event includes an identifier of the preset event and an identifier of an operation object of the preset event. If the preset event is the kernel module loading function, the process creation function, or the thread creation function, the debugging information of the preset event further includes a loading address of the operation object of the preset event. It can be learned that an information amount of the debugging information of the preset event is relatively small, and is generally only about 100 rows. Therefore, according to the technical solution provided in this embodiment of the present invention, an amount of data to be processed by a processor of the target machine can be reduced, thereby improving debugging efficiency.

S104. After determining that the core A stops running, the debugging apparatus determines the reason that the core A stops running, and if the reason that the core A stops running is the preset event, the debugging apparatus obtains the debugging information of the preset event, and sets a preset pending breakpoint as an operation object of the preset event according to the debugging information of the preset event, where the operation object of the preset event is the kernel mode code or the user mode code.

The debugging apparatus sends a second stop termination instruction to the core A, where the second stop termination instruction is used to instruct the core A to resume running.

As shown in FIG. 6.2, it should be noted that, if the core A stops running after completing the execution of the debugging information collection function, in a process of executing the debugging information collection function, the core A writes, into the data header to replace default information, an identifier that is of the preset event and that is used for triggering the core A to execute the debugging information collection function, and writes the identifier of the operation object of the preset event into the data body. If the preset event is the kernel module loading function, the process creation function, or the thread creation function, the core A further writes the loading address of the operation object of the preset event into the data body. It should be noted that, the loading address of the operation object of the preset event may be continuous or discontinuous. It is easily understood that, if the preset event is the process switching function, the process blocking function, the process wakeup function, the thread switching function, the thread blocking function, or the thread wakeup function, the debugging information collection function includes the identifier the preset event and the identifier of the operation object of the preset event. If the preset event is the kernel module loading function, the process creation function, or the thread creation function, the debugging information collection function includes the identifier of the preset event, the identifier of the operation object of the preset event, and the loading address of the operation object of the preset event.

Correspondingly, if the core A stops running after completing the execution of the debugging information collection function, that after determining that the core A stops running, the debugging apparatus determines the reason that the core A stops running in S104 specifically includes: after determining, in a polling manner, that the core A stops running, the debugging apparatus determines, by reading the content of the data header, the reason that the core A stops running. Because the content of the data header includes the identifier of the preset event, the debugging apparatus can determine, according to the identifier of the preset event, that the reason that the core A stops running is the preset event.

It should be noted that, that the debugging apparatus obtains the debugging information of the preset event, and sets a preset pending breakpoint as an operation object of the preset event according to the debugging information of the preset event in S104 specifically includes:

if the debugging apparatus determines, according to the identifier of the preset event, that the preset event is the kernel module loading function, the process creation function, or the thread creation function, the debugging apparatus reads, from the data body, the loading address of the operation object of the preset event according to the address of the data body located in the data header, and then sets the preset pending breakpoint as a destination address of the operation object of the preset event according to the loading address of the operation object of the preset event. Certainly, the destination address of the operation object of the preset event is located in the loading address of the operation object of the preset event.

Alternatively, if the debugging apparatus determines, according to the identifier of the preset event, that the preset event is the process switching function, the process blocking function, the process wakeup function, the thread creation function, the thread switching function, or the thread blocking function, the debugging apparatus reads, from the data body, the identifier of the operation object of the preset event according to the address of the data body located in the data header, determines the loading address of the operation object of the preset event according to the identifier of the operation object of the preset event, and sets the preset pending breakpoint as a destination address of the operation object of the preset event according to the loading address of the operation object of the preset event.

It should be noted that, because a correspondence between the identifier of the operation object of the preset event and the loading address of the operation object of the preset event is pre-stored in storage space of the second host machine, the debugging apparatus determines the loading address of the operation object of the preset event according to the identifier of the operation object of the preset event. Specifically, the debugging apparatus obtains, from the storage space of the second host machine, the loading address of the operation object of the preset event according to the identifier of the operation object of the preset event and the correspondence.

With reference to FIG. 6.1 and FIG. 6.2, it can be learned that in the technical solution provided in this embodiment of the present invention, if the preset event is the kernel module loading function, the process creation function, the process switching function, the process blocking function, the process wakeup function, the thread creation function, the thread switching function, the thread blocking function, or the thread wakeup function, and if the core A stops running after completing the execution of the debugging information collection function, content of the data header and the data body is shown in FIG. 6.2; if the core A stops running due to another event, content of the data header and the data body is shown in FIG. 6.1. Certainly, a case in which the execution of the debugging information collection function is completed is excluded from the another event. That is, the data header and the data body include only one message. When obtaining information from the data header, the debugging apparatus does not need to distinguish which is target information. In addition, because the data header and the data body include only one message, the size of the preset storage space in the memory of the target machine is fixed, and space occupied by the preset storage space is extremely small, thereby avoiding occupying excessive storage resources of the target machine, and improving efficiency of obtaining information.

It should be noted that, if the preset event is the kernel module loading function, the operation object of the preset event is a kernel module; if the preset event is the process creation function, the process switching function, the process blocking function, or the process wakeup function, the operation object of the preset event is a process; and if the preset event is the thread creation function, the thread switching function, the thread blocking function, or the thread wakeup function, the operation object of the preset event is a thread. The kernel module may be a dynamic patch, a hot patch, a dynamic library, or the like.

Referring to FIG. 4A and FIG. 4B, in an embodiment of the present invention, the debugging apparatus includes a debugging agent and a debugger, and the debugging apparatus is applied to the remote debugging system described in FIG. 2. It should be noted that, the debugging agent and the debugger may be located in a same host machine, or may be located in different host machines. For example, in FIG. 2, the debugging agent is located in a first host machine, and the debugger is located in a second host machine. As shown in FIG. 4B, if the debugging apparatus includes the debugging agent and the debugger, S104 in FIG. 3 specifically includes the following steps.

S206. After determining that the core A stops running, the debugging agent determines the reason that the core A stops running, and if the reason that the core A stops running is the preset event, the debugging agent reports a second message to the debugger, where the second message includes the identifier indicating that the core A stops running and an identifier of the preset event.

It should be noted that, if the core A stops running after completing the execution of the debugging information collection function, S206 specifically includes: after determining, in a polling manner, that the core A stops running, the debugging agent determines, by reading the content of the data header, the reason that the core A stops running. Because the content of the data header includes the identifier of the preset event, the debugging agent can determine, according to the identifier of the preset event, that the reason that the core A stops running is the preset event, and report, to the debugger, the second message including the identifier indicating that the core A stops running and the identifier of the preset event.

S207. After receiving the second message, the debugger obtains the debugging information of the preset event according to the identifier of the preset event, and sets the preset pending breakpoint as the operation object of the preset event according to the debugging information of the preset event.

The debugger instructs the debugging agent to send the second stop termination instruction to the core A, where the second stop termination instruction is used to instruct the core A to resume running.

It should be noted that, that the debugger obtains the debugging information of the preset event according to the identifier of the preset event specifically includes: the debugger reads, from the data body, the identifier of the operation object of the preset event or the loading address of the operation object of the preset event according to the identifier of the preset event.

In an implementation manner of the present invention, if it is determined, according to the identifier of the preset event, that the preset event is the kernel module loading function, the process creation function, or the thread creation function, the debugger reads, from the data body, the loading address of the operation object of the preset event according to the address of the data body located in the data header, and then sets the preset pending breakpoint as the destination address of the operation object of the preset event according to the loading address of the operation object of the preset event. Certainly, the destination address of the operation object of the preset event is located in the loading address of the operation object of the preset event.

In another implementation manner of the present invention, if it is determined, according to the identifier of the preset event, that the preset event is the process switching function, the process blocking function, the process wakeup function, the thread creation function, the thread switching function, or the thread blocking function, the debugger reads, from the data body, the identifier of the operation object of the preset event according to the address of the data body located in the data header, determines the loading address of the operation object of the preset event according to the identifier of the operation object of the preset event, and sets the preset pending breakpoint as the destination address of the operation object of the preset event according to the loading address of the operation object of the preset event.

It should be noted that, because the correspondence between the identifier of the operation object of the preset event and the loading address of the operation object of the preset event is pre-stored in the storage space of the second host machine, the debugger determines the loading address of the operation object of the preset event according to the identifier of the operation object of the preset event. Specifically, the debugger obtains, from the storage space of the second host machine, the loading address of the operation object of the preset event according to the identifier of the operation object of the preset event and the correspondence.

It should be noted that, the loading address of the operation object of the preset event in this embodiment of the present invention refers to a loading address of a target code of the operation object of the preset event, and the loading address of the target code of the operation object of the preset event refers to a loading address, on the target machine side, of the target code of the operation object of the preset event. A loading address of a source code of the operation object of the preset event refers to a loading address, on the second host machine side, of the source code of the operation object of the preset event. In this case, specifically, that the debugger sets the preset pending breakpoint as the destination address of the operation object of the preset event according to the loading address of the operation object of the preset event includes:

the debugger creates a symbol table according to a correspondence between the loading address of the target code of the operation object of the preset event and the loading address of the source code of the operation object of the preset event; and then the debugger determines, according to the symbol table, a target address that is on the target code side of the operation object of the preset event and that is mapped to the pending breakpoint (or the pending breakpoint), and sets the pending breakpoint as the destination address of the operation object of the preset event. The pending breakpoint (or the pending breakpoint) is set by a debugging engineer on the source code side of the operation object of the preset event in advance.

In this embodiment of the present invention, that "the debugger instructs the debugging agent to send the second stop termination instruction" occurs after "the debugger sets the preset pending breakpoint as the operation object of the preset event". In another embodiment of the present invention, that "the debugger instructs the debugging agent to send the second stop termination instruction" may occur at any moment after "the debugger obtains the debugging information of the preset event" and before "the debugger sets the preset pending breakpoint as the operation object of the preset event".

S208. The debugging agent sends a second stop termination instruction to the core A.

S105. The core A sends a running resumption instruction to the other cores after receiving the second stop termination instruction and resuming running, where the running resumption instruction is used to instruct the other cores to resume running.

The core A knocks the pending breakpoint in a process of running the operation object of the preset event, so as to enter a debugging state.

As explained for step S301 above, if the target machine includes the system on chip SOC, and the multi-core processor including the core A is integrated into the SOC, that the core A sends a running resumption instruction to the other cores, where the running resumption instruction is used to instruct the other cores to resume running is specifically: the core A sends the running resumption instruction to the other cores by using the hardware cross-trigger network of the SOC, where the running resumption instruction is used to instruct the other cores to resume running. It should be noted that, when sending the running resumption instruction to the other cores by using the hardware cross-trigger network of the SOC, the core A sends the running resumption instruction in a broadcast form. Similarly, an advantage of transmitting a signal by using the hardware cross-trigger network of the SOC lies in that time validity of transmission of the running resumption instruction can be improved.

It can be learned from above that, according to the debugging method provided in this embodiment of the present invention, a debugging interface function is added to a trailer of a preset event that runs on a core A. The debugging interface function invokes a function that is associated with a type of the preset event and that is in a kernel debugging stub, to obtain debugging information of the preset event. A debugger may set a preset pending breakpoint as a destination address of an operation object of the preset event according to the debugging information of the preset event, so that the core A knocks the pending breakpoint in a subsequent process of running the operation object of the preset event, so as to enter a debugging state. In this embodiment of the present invention, the preset event is a kernel mode code processing function or a user mode code processing function. Therefore, according to the technical solution provided in this embodiment of the present invention, kernel mode code and user mode code can be debugged on a same debugging platform.

Embodiment 2

Figure 7:
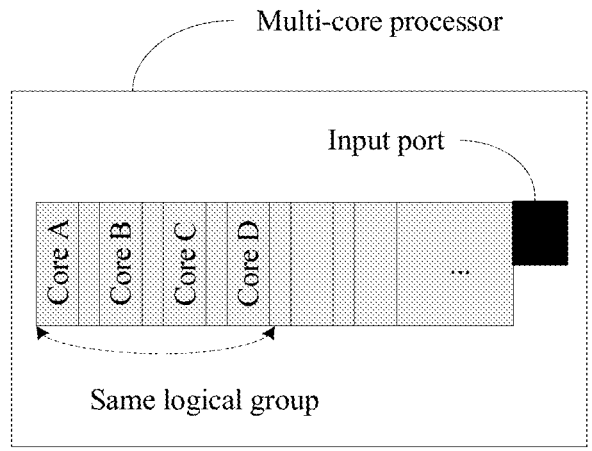
FIG. 7 is a schematic structural diagram of a multi-core processor according to an embodiment of the present invention.

Referring to FIG. 7, this embodiment of the present invention provides a multi-core processor applied to the debugging method described in Embodiment 1, and the multi-core processor is deployed on a target machine in the remote debugging system shown in FIG. 1. As shown in FIG. 7, the multi-core processor includes a core A, an input port, and other cores. The other cores include a core B, a core C, and a core D. The core B, the core C, the core D, and the core A all are located in the multi-core processor and belong to a same logical group.

The core A is configured to: stop running after completing execution of a processing routine of a preset event, and send a running stop signal to the other cores in a process of stopping running, where the running stop signal is used to instruct the other cores to stop running, and the preset event is a kernel mode code processing function or a user mode code processing function.

As shown in FIG. 5, in this embodiment of the present invention, a debugging interface function is added to a trailer of the preset event. The debugging interface function is located outside the preset event, and is not a part of the preset event. A first debugging exception instruction is set in a header of the debugging interface function, and the core A stops running after completing execution of the first debugging exception instruction. Therefore, the core A is specifically configured to: after completing the execution of the processing routine of the preset event, start to execute the first debugging exception instruction located in the header of the debugging interface function, and send the running stop signal to the other cores in a process of executing the first debugging exception instruction.

In an embodiment of the present invention, if the target machine includes a system on chip SOC, and the multi-core processor including the core A is integrated into the SOC, the core A is specifically configured to send the running stop signal to the other cores by using a hardware cross-trigger network of the SOC. The running stop signal is used to instruct the other cores to stop running. It should be noted that, when sending a running resumption instruction to the other cores by using the hardware cross-trigger network of the SOC, the core A sends the running resumption instruction in a broadcast form. An advantage of transmitting a signal by using the hardware cross-trigger network of the system on chip SOC lies in that time validity of transmission of the running stop signal is improved.

It should be noted that, the kernel mode code processing function is a kernel module loading function; and the user mode code processing function is a process creation function, a process switching function, a process blocking function, a process wakeup function, a thread creation function, a thread switching function, a thread blocking function, or a thread wakeup function. It is easily learned that regardless of multiple processes or multiple threads that run on a heterogeneous multi-core processor in an asymmetric multi-processing (AMP, asymmetric multi-processing) structure, or multiple processes or multiple threads that run on a homogeneous multi-core processor in a symmetric multi-processing (SMP, symmetric multi-processing) structure, synchronous debugging can be implemented by using the multi-core processor provided in this embodiment of the present invention.

Referring to FIG. 7, the core A, the core B, the core C, and the core D are located in the same logical group. Data exchange is performed between code that runs on at least one core (such as the core B) of the core B, the core C, or the core D and code that runs on the core A. In this case, during debugging of the core A, if the core B continues to run, distortion may occur because data exchange cannot be correctly performed between the code that runs on the core B and the code that runs on the core A. Therefore, in the solution provided in this embodiment of the present invention, during debugging of the core A, the other cores that belong to the same logical group as the core A stop running, to avoid distortion. Further, the core A and the other cores first synchronously stop running, and then the core A resumes running for debugging. In addition, in order that the core A and the other cores synchronously stop running, a time at which the running stop signal sent by the core A is transmitted to the other cores and a time at which the core A stops running are further fully considered in design of the solution. Specifically, after stopping running, the core A sends a running stop instruction to the other cores in a running stop period, so that the core A and the other cores synchronously stop running, thereby implementing relatively precise synchronous debugging.

The input port is configured to: receive a first stop termination instruction, and forward the first stop termination instruction to the core A, where the first stop termination instruction is sent by a debugging apparatus in the remote debugging system after the debugging apparatus determines that the core A stops running and that a reason that the core A stops running is a reason other than the preset event.

The core A is further configured to: after receiving the first stop termination instruction and resuming running, execute a debugging information collection function to collect debugging information of the preset event, and stop running after completing the execution of the debugging information collection function.

Referring to FIG. 5, it should be noted that, the debugging information collection function includes the debugging interface function added to the trailer of the preset event and a function associated with the preset event. The function associated with the preset event is located in a kernel debugging stub, and the kernel debugging stub is implanted into an operating system of the target machine in advance.

A second debugging exception instruction is set in a trailer of the debugging interface function. In a process of executing the debugging interface function, the function that is associated with the preset event and that is located in the kernel debugging stub is invoked.

It should be noted that, the core A is specifically configured to: execute the function associated with the preset event to collect the debugging information of the preset event, and then execute the second debugging exception instruction located in the trailer of the debugging interface function. The core A stops running after the core A completes the execution of the second debugging exception instruction.

It should be noted that, the debugging information of the preset event includes an identifier of the preset event and an identifier of an operation object of the preset event. If the preset event is the kernel module loading function, the process creation function, or the thread creation function, the debugging information of the preset event further includes a loading address of the operation object of the preset event. It can be learned that an information amount of the debugging information of the preset event is relatively small, and is generally only about 100 rows. Therefore, according to the technical solution provided in this embodiment of the present invention, an amount of data to be processed by a processor of the target machine can be reduced, thereby improving debugging efficiency.

The input port is further configured to: receive a second stop termination instruction, and forward the second stop termination instruction to the core A, where the second stop termination instruction is sent by the debugging apparatus after the debugging apparatus sets a preset pending breakpoint as the operation object of the preset event according to the debugging information of the preset event.

It should be noted that, if the preset event is the kernel module loading function, the operation object of the preset event is a kernel module; if the preset event is the process creation function, the process switching function, the process blocking function, or the process wakeup function, the operation object of the preset event is a process; and if the preset event is the thread creation function, the thread switching function, the thread blocking function, or the thread wakeup function, the operation object of the preset event is a thread. The kernel module may be a dynamic patch, a hot patch, a dynamic library, or the like.

The core A is further configured to: send a running resumption instruction to the other cores after receiving the second stop termination instruction and resuming running, where the running resumption instruction is used to instruct the other cores to resume running; and knock the pending breakpoint in a process of running the operation object of the preset event, so as to enter a debugging state.

As described above, if the target machine includes the system on chip SOC, and the multi-core processor including the core A is integrated into the SOC, the core A is specifically configured to send the running resumption instruction to the other cores by using the hardware cross-trigger network of the SOC. The running resumption instruction is used to instruct the other cores to resume running. It should be noted that, when sending the running resumption instruction to the other cores by using the hardware cross-trigger network of the SOC, the core A sends the running resumption instruction in a broadcast form. Similarly, an advantage of transmitting a signal by using the hardware cross-trigger network of the SOC lies in that time validity of transmission of the running resumption instruction can be improved.

It can be learned from above that, according to the multi-core processor provided in this embodiment of the present invention, a debugging interface function is added to a trailer of a preset event that runs on a core A. The debugging interface function invokes a function that is associated with a type of the preset event and that is in a kernel debugging stub, to obtain debugging information of the preset event. Therefore, a debugging apparatus sets a preset pending breakpoint as a destination address of an operation object of the preset event according to the debugging information of the preset event, so that the core A knocks the pending breakpoint in a subsequent process of running the operation object of the preset event, so as to enter a debugging state. In this embodiment of the present invention, the preset event is a kernel mode code processing function or a user mode code processing function. Therefore, according to the multi-core processor provided in this embodiment of the present invention, kernel mode code and user mode code can be debugged on a same debugging platform.

Embodiment 3

Figure 8:
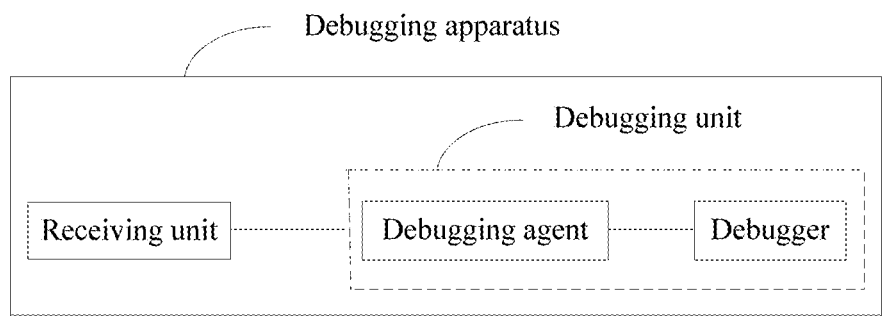
FIG. 8 is a schematic structural diagram of a debugging apparatus according to an embodiment of the present invention.

Referring to FIG. 8, this embodiment of the present invention includes a debugging apparatus applied to the debugging method described in Embodiment 1, and the debugging apparatus is deployed on a host machine in the remote debugging system shown in FIG. 1. As shown in FIG. 8, the debugging apparatus includes a debugging unit and a receiving unit.

The receiving unit is configured to: receive a message used for instructing a core A to stop running, and forward the message used for instructing the core A to stop running to the debugging apparatus, where a target machine located in the remote debugging system includes a multi-core processor, and the multi-core processor includes the core A.

The debugging unit is configured to: after determining that the core A stops running, determine a reason that the core A stops running.

If the reason that the core A stops running is a preset event, the debugging unit is further configured to: obtain debugging information of the preset event, and set a preset pending breakpoint as an operation object of the preset event according to the debugging information of the preset event, where the preset event is a kernel mode code processing function or a user mode code processing function, and the operation object of the preset event is the kernel mode code or the user mode code.

It should be noted that, the kernel mode code processing function is a kernel module loading function; and the user mode code processing function is a process creation function, a process switching function, a process blocking function, a process wakeup function, a thread creation function, a thread switching function, a thread blocking function, or a thread wakeup function. If the preset event is the kernel module loading function, the operation object of the preset event is a kernel module; if the preset event is the process creation function, the process switching function, the process blocking function, or the process wakeup function, the operation object of the preset event is a process; and if the preset event is the thread creation function, the thread switching function, the thread blocking function, or the thread wakeup function, the operation object of the preset event is a thread. The kernel module may be a dynamic patch, a hot patch, a dynamic library, or the like.

It should be noted that, there is preset storage space in a memory of the target machine, the preset storage space is specified by a debugging engineer in the memory of the target machine in advance, and both a size and an address of the preset storage space are fixed. The preset storage space is used to store a data header. Initially, the data header includes first default information and an address of a data body, and certainly, the first default information may be empty. The data body includes second default information, and certainly, the second default information may also be empty.

As shown in FIG. 6.2, if the core A stops running after completing execution of the debugging information collection function, in a process of executing the debugging information collection function, the core A writes, into the data header to replace default information, an identifier that is of the preset event and that is used for triggering the core A to execute the debugging information collection function, and writes an identifier of the operation object of the preset event into the data body. If the preset event is the kernel module loading function, the process creation function, or the thread creation function, the core A further writes a loading address of the operation object of the preset event into the data body. It should be noted that, the loading address of the operation object of the preset event may be continuous or discontinuous.

If the reason that the core A stops running is the preset event, the debugging unit is specifically configured to: after determining that the core A stops running, determine, by reading content of the data header, the reason that the core A stops running. Because the content of the data header includes the identifier of the preset event, the debugging unit can determine, according to the identifier of the preset event, that the reason that the core A stops running is the preset event.

Further, if it is determined, according to the identifier of the preset event, that the preset event is the kernel module loading function, the process creation function, or the thread creation function, the debugging unit is specifically configured to: read, from the data body, the loading address of the operation object of the preset event according to the address of the data body located in the data header, and then set the preset pending breakpoint as a destination address of the operation object of the preset event according to the loading address of the operation object of the preset event.

Alternatively, if it is determined, according to the identifier of the preset event, that the preset event is the process switching function, the process blocking function, the process wakeup function, the thread creation function, the thread switching function, or the thread blocking function, the debugging unit is specifically configured to: read, from the data body, the identifier of the operation object of the preset event according to the address of the data body located in the data header, determine the loading address of the operation object of the preset event according to the identifier of the operation object of the preset event, and set the preset pending breakpoint as a destination address of the operation object of the preset event according to the loading address of the operation object of the preset event.

It should be noted that, a correspondence between the identifier of the operation object of the preset event and the loading address of the operation object of the preset event is pre-stored in storage space of the second host machine. Therefore, the debugging unit is specifically configured to obtain, from the storage space of the second host machine, the loading address of the operation object of the preset event according to the identifier of the operation object of the preset event and the correspondence.

It should be noted that, if the reason that the core A stops running is a reason other than the preset event, the debugging unit in the debugging apparatus provided in this embodiment of the present invention is further configured to instruct the core A to resume running, to collect the debugging information of the preset event.

Specifically, if the reason that the core A stops running is a reason other than the preset event, the debugging unit is specifically configured to: after determining that the core A stops running, determine, by reading the content of the data header, the reason that the core A stops running. Because the content of the data header includes the first default information, the debugging unit can determine, according to the first default information, that the reason that the core A stops running is a reason other than the preset event.

In an embodiment of the present invention, as shown in FIG. 8, the debugging unit includes a debugging agent and a debugger. It should be noted that, the debugging agent and the debugger in the debugging apparatus shown in FIG. 8 may be located in a same host machine, or may be located in different host machines. Referring to the remote debugging system shown in FIG. 2, the debugging agent and the debugger are respectively located in different host machines. The debugging agent is located in a first host machine, and the debugger is located in the second host machine.

If the debugging unit includes the debugging agent and the debugger, and the reason that the core A stops running is the preset event, the debugging agent is specifically configured to: after determining that the core A stops running, determine the reason that the core A stops running, and if the reason that the core A stops running is the preset event, report a second message to the debugger, where the second message includes an identifier indicating that the core A stops running and the identifier of the preset event.

Further, the debugging agent is specifically configured to: after determining, in a polling manner, that the core A stops running, determine, by reading the identifier that is of the preset event and that is included in the content of the data header, that the reason that the core A stops running is the preset event; and report, to the debugger, the second message including the identifier indicating that the core A stops running and the identifier of the preset event.

The debugger is specifically configured to: after receiving the second message, obtain the debugging information of the preset event according to the identifier of the preset event, and set the preset pending breakpoint as the operation object of the preset event according to the debugging information of the preset event.

Further, the debugger is specifically configured to read, from the data body, the identifier of the operation object of the preset event or the loading address of the operation object of the preset event according to the identifier that is of the preset event and that is in the second message.

In an implementation manner of the present invention, if it is determined, according to the identifier of the preset event, that the preset event is the kernel module loading function, the process creation function, or the thread creation function, the debugger is specifically configured to: read, from the data body, the loading address of the operation object of the preset event according to the address of the data body located in the data header, and then set the preset pending breakpoint as the destination address of the operation object of the preset event according to the loading address of the operation object of the preset event.

In another implementation manner of the present invention, if it is determined, according to the identifier of the preset event, that the preset event is the process switching function, the process blocking function, the process wakeup function, the thread creation function, the thread switching function, or the thread blocking function, the debugger is specifically configured to: read, from the data body, the identifier of the operation object of the preset event according to the address of the data body located in the data header, determine the loading address of the operation object of the preset event according to the identifier of the operation object of the preset event, and set the preset pending breakpoint as the destination address of the operation object of the preset event according to the loading address of the operation object of the preset event.

It should be noted that, because the correspondence between the identifier of the operation object of the preset event and the loading address of the operation object of the preset event is pre-stored in the storage space of the second host machine, the debugger determines the loading address of the operation object of the preset event according to the identifier of the operation object of the preset event. Specifically, the debugger obtains, from the storage space of the second host machine, the loading address of the operation object of the preset event according to the identifier of the operation object of the preset event and the correspondence.

In another embodiment of the present invention, if the debugging unit includes the debugging agent and the debugger, and the reason that the core A stops running is a reason other than the preset event, the debugging agent is specifically configured to: after determining that the core A stops running, determine the reason that the core A stops running, and if the reason that the core A stops running is a reason other than the preset event, send a first stop termination instruction to the core A, where the first stop termination instruction is used to instruct the core A to resume running, to collect the debugging information of the preset event.

Further, the debugging agent is specifically configured to: after determining, in a polling manner, that the core A stops running, read the first default information included in the content of the data header, and determine, according to the first default information, that the reason that the core A stops running is a reason other than the preset event.

In still another embodiment of the present invention, if the debugging unit includes the debugging agent and the debugger, and the reason that the core A stops running is a reason other than the preset event, the debugging agent is specifically configured to: after determining, in a polling manner, that the core A stops running, determine the reason that the core A stops running, and if the reason that the core A stops running is a reason other than the preset event, report a first message to the debugger, where the first message includes the identifier indicating that the core A stops running and a default identifier.

Further, the debugging agent is specifically configured to: after determining, in a polling manner, that the core A stops running, read the first default information included in the content of the data header; determine, according to the first default information, that the reason that the core A stops running is a reason other than the preset event; and report, to the debugger, the identifier indicating that the core A stops running and the default identifier.

The debugger is specifically configured to: after receiving the first message, instruct the debugging agent to send the first stop termination instruction to the core A, where the first stop termination instruction is used to instruct the core A to resume running.

The debugging agent is specifically configured to send the first stop termination instruction to the core A.

The debugging unit is further configured to instruct the core A to resume running, so that the core A knocks the pending breakpoint in a process of running the operation object of the preset event, and the core A enters a debugging state.

If the debugging unit includes the debugging agent and the debugger, the debugger is specifically configured to instruct the debugging agent to send a second stop termination instruction to the core A, where the second stop termination instruction is used to instruct the core A to resume running, so that the core A knocks the pending breakpoint in process of running the operation object of the preset event, and the core A enters a debugging state.

It can be learned from above that, according to the debugging apparatus provided in this embodiment of the present invention, after determining that a core A of a multi-core processor on a target machine side stops running, if it is determined that a reason that the core A stops running is a preset event, the debugging apparatus obtains, from the target machine side, debugging information of the preset event, and sets a preset pending breakpoint as an operation object of the preset event according to the debugging information of the preset event, so as to debug the operation object of the preset event. In this embodiment of the present invention, because the preset event is a kernel mode code processing function or a user mode code processing function, the operation object of the preset event is kernel mode code or user mode code. Therefore, according to the debugging apparatus provided in this embodiment of the present invention, not only the kernel mode code can be debugged, but also the user mode code can be debugged.

Embodiment 4

Figure 9:
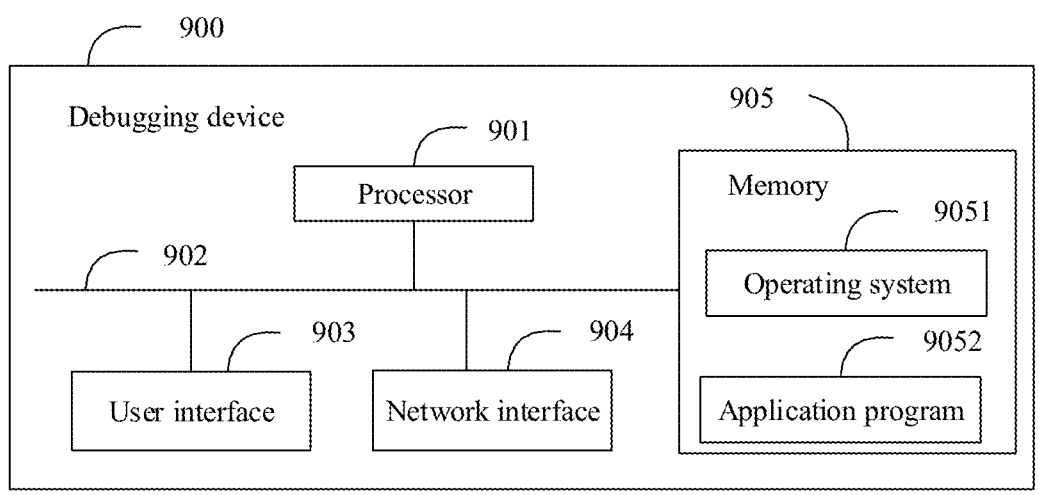
FIG. 9 is a schematic structural diagram of a debugging device according to an embodiment of the present invention.

Referring to FIG. 9, FIG. 9 is a structural block diagram of a debugging device 900 according to an embodiment of the present invention. The debugging device 900 is applied to the remote debugging system shown in FIG. 1, and the debugging device 900 is a specific implementation manner of a host machine in the remote debugging system shown in FIG. 1. Specifically, as shown in FIG. 9, the debugging device 900 includes: at least one processor 901, at least one network interface 904 or another user interface 903, a memory 905, and at least one communications bus 902. The communications bus 902 is configured to implement connection and communication between these components. The debugging device 900 optionally includes the user interface 903, including a display (such as a touchscreen, an LCD, a CTR, a holographic (Holographic) device, or a projector (Projector)), a keyboard, or a click device (such as a mouse, a trackball (trackball), a touchpad, or a touchscreen).

The memory 905 may include a read-only memory and a random access memory, and may provide an instruction and data for the processor. A part of the memory 905 may further include a nonvolatile random access memory (NVRAM).

In some embodiments, the memory 905 stores the following elements: an executable module or a data structure, or a subset thereof, or an extension set thereof:

an operating system 9051, including various system programs, such as a framework layer, a kernel library layer, and a drive layer, and configured to implement various basic services and process hardware-based tasks; and an application program module 9052, including various application programs, such as a launcher (launcher), a media player (Media Player), and a browser (Browser), and configured to implement various application services.

In this embodiment of the present invention, the processor 901 is configured to: after determining that the core A stops running, determine a reason that the core A stops running. A target machine located in the remote debugging system includes a multi-core processor, and the multi-core processor includes the core A.

It should be noted that, there is preset storage space in a memory of the target machine side, the preset storage space is specified by a debugging engineer in the memory of the target machine in advance, and both a size and an address of the preset storage space are fixed. The preset storage space is used to store a data header. Initially, the data header includes first default information and an address of a data body, and certainly, the first default information may be empty. The data body includes second default information, and certainly, the second default information may also be empty.

As shown in FIG. 6.2, if the core A stops running after completing execution of the debugging information collection function, in a process of executing the debugging information collection function, the core A writes, into the data header to replace default information, an identifier that is of a preset event and that is used for triggering the core A to execute the debugging information collection function, and writes an identifier of an operation object of the preset event into the data body. If the preset event is a kernel module loading function, a process creation function, or a thread creation function, the core A further writes a loading address of the operation object of the preset event into the data body. It should be noted that, the loading address of the operation object of the preset event may be continuous or discontinuous. As shown in FIG. 6.1, if the core A stops running due to another reason, the data header still includes the first default information and the address of the data body, and the data body still includes the second default information.

The processor 901 is specifically configured to: after determining that the core A stops running, determine, by reading content of the data header, the reason that the core A stops running; if the data header includes the identifier of the preset event, determine that the reason that the core A stops running is the preset event; and if the data header includes the first default information, determine that the reason that the core A stops running is a reason other than the preset event.

If the reason that the core A stops running is the preset event, the processor 901 is further configured to: obtain debugging information of the preset event, and set a preset pending breakpoint as the operation object of the preset event according to the debugging information of the preset event, where the preset event is a kernel mode code processing function or a user mode code processing function, and the operation object of the preset event is kernel mode code or user mode code.

According to the foregoing description in this embodiment, it can be determined that the debugging information of the preset event includes the identifier of the preset event and the identifier of the operation object of the preset event. If the preset event is the kernel module loading function, the process creation function, or the thread creation function, the debugging information of the preset event further includes the loading address of the operation object of the preset event.

It should be noted that, the kernel mode code processing function is the kernel module loading function; and the user mode code processing function is the process creation function, a process switching function, a process blocking function, a process wakeup function, the thread creation function, a thread switching function, a thread blocking function, or a thread wakeup function. If the preset event is the kernel module loading function, the operation object of the preset event is a kernel module; if the preset event is the process creation function, the process switching function, the process blocking function, or the process wakeup function, the operation object of the preset event is a process; and if the preset event is the thread creation function, the thread switching function, the thread blocking function, or the thread wakeup function, the operation object of the preset event is a thread.

It should be noted that, if the reason that the core A stops running is the preset event, and if it is determined, according to the identifier of the preset event, that the preset event is the kernel module loading function, the process creation function, or the thread creation function, the processor 901 is specifically configured to: read, from the data body, the loading address of the operation object of the preset event according to the address of the data body located in the data header, and then set the preset pending breakpoint as a destination address of the operation object of the preset event according to the loading address of the operation object of the preset event.

Alternatively, if it is determined, according to the identifier of the preset event, that the preset event is the process switching function, the process blocking function, the process wakeup function, the thread creation function, the thread switching function, or the thread blocking function, the processor 901 is configured to: read, from the data body, the identifier of the operation object of the preset event according to the address of the data body located in the data header, determine the loading address of the operation object of the preset event according to the identifier of the operation object of the preset event, and set the preset pending breakpoint as a destination address of the operation object of the preset event according to the loading address of the operation object of the preset event.

It should be noted that, a correspondence between the identifier of the operation object of the preset event and the loading address of the operation object of the preset event is pre-stored in storage space of the debugging device. Therefore, the processor 901 is specifically configured to obtain, from the storage space of the second host machine, the loading address of the operation object of the preset event according to the identifier of the operation object of the preset event and the correspondence.

The memory 905 is configured to store the debugging information of the preset event.

The processor 901 is further configured to instruct the core A to resume running, so that the core A knocks the pending breakpoint in a process of running the operation object of the preset event, and the core A enters a debugging state.

In another embodiment of the present invention, if the reason that the core A stops running is a reason other than the preset event, the processor 901 is further configured to instruct the core A to resume running, to collect the debugging information of the preset event.

It can be learned from above that, according to the debugging device provided in this embodiment of the present invention, after determining that a core A of a multi-core processor on a target machine side stops running, if it is determined that a reason that the core A stops running is a preset event, the debugging device obtains, from the target machine side, debugging information of the preset event, and sets a preset pending breakpoint as an operation object of the preset event according to the debugging information of the preset event, so as to debug the operation object of the preset event. In this embodiment of the present invention, because the preset event is a kernel mode code processing function or a user mode code processing function, the operation object of the preset event is kernel mode code or user mode code. Therefore, according to the debugging device provided in this embodiment of the present invention, not only the kernel mode code can be debugged, but also the user mode code can be debugged.

Mutual reference may be made to the foregoing embodiments. It may be clearly understood by a person skilled in the art that, for the purpose of convenient and brief description, for a detailed working process of the foregoing apparatus, device, and unit, reference may be made to a corresponding process in the foregoing method embodiments, and details are not described herein again.

In the several embodiments provided in this application, it should be understood that the disclosed method, apparatus, and device may be implemented in other manners. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It should be understood that, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A debugging method for debugging a target machine that comprises a multi-core processor, comprising:
   a core A of the multi-core processor configured to execute a first debugging exception instruction located in a header of a debugging interface function and to stop running after completing execution of a processing routine of a preset event wherein the preset event is a kernel mode code processing function or a user mode code processing function;
   the core A further sending a running stop signal, in a process of executing the first debugging exception instruction, to other cores of the multi-core processor that belong to a same logical group as the core A to instruct the other cores to stop running;
   after receiving a first stop termination instruction and resuming running, executing, by the core A, a debugging information collection function to collect debugging information of the preset event, and stopping running after completing the execution of the debugging information collection function, wherein the first stop termination instruction is sent by a debugging apparatus in the remote debugging system after the debugging apparatus determines that the core A stops running and that a reason that the core A stops running is a reason other than the preset event, the debugging information collection function comprises the debugging interface function, the first debugging exception instruction is set in the header of the debugging interface function, and the first debugging exception instruction is used to instruct the core A to stop running;
   after receiving a second stop termination instruction and resuming running, sending, by the core A, a running resumption instruction to the other cores, wherein the running resumption instruction is used to instruct the other cores to resume running, and the second stop termination instruction is sent by the debugging apparatus after the debugging apparatus sets a preset pending breakpoint as an operation object of the preset event according to the debugging information of the preset event; and
   knocking, by the core A, the pending breakpoint in a process of running the operation object of the preset event, so as to enter a debugging state.

2. The method according to claim 1, wherein
   the debugging information collection function further comprises a function associated with the preset event, a second debugging exception instruction is further set in a trailer of the debugging interface function, and the second debugging exception instruction is used to instruct the core A to stop running; and
   the executing, by the core A, a debugging information collection function to collect debugging information of the preset event, and stopping running after completing the execution of the debugging information collection function specifically comprises:

executing, by the core A, the function associated with the preset event to collect the debugging information of the preset event, and then executing the second debugging exception instruction located in the trailer of the debugging interface function.

3. The method according to claim 2, wherein
the function associated with the preset event is located in a kernel debugging stub, and the kernel debugging stub is implanted into an operating system of the target machine in advance.

4. The method according to claim 1, wherein
the kernel mode code processing function is a kernel module loading function; and
the user mode code processing function is a process creation function, a process switching function, a process blocking function, a process wakeup function, a thread creation function, a thread switching function, a thread blocking function, or a thread wakeup function.

5. The method according to claim 4, wherein
if the preset event is the kernel module loading function, the operation object of the preset event is a kernel module;
if the preset event is the process creation function, the process switching function, the process blocking function, or the process wakeup function, the operation object of the preset event is a process; and
if the preset event is the thread creation function, the thread switching function, the thread blocking function, or the thread wakeup function, the operation object of the preset event is a thread.

6. The method according to claim 4, wherein the debugging information of the preset event comprises an identifier of the operation object of the preset event; and
if the preset event is the kernel module loading function, the process creation function, or the thread creation function, the debugging information of the preset event further comprises a loading address of the operation object of the preset event.

7. The method according to claim 1, wherein the multi-core processor is integrated into a system on chip SOC;
the sending, by a core A, a running stop signal to other cores, wherein the running stop signal is used to instruct the other cores to stop running specifically comprises:
sending, by the core A, the running stop signal to the other cores by using a hardware cross-trigger network of the SOC, wherein the running stop signal is used to instruct the other cores to stop running; and
the sending, by the core A, a running resumption instruction to the other cores, wherein the running resumption instruction is used to instruct the other cores to resume running specifically comprises:
sending, by the core A, the running resumption instruction to the other cores by using the hardware cross-trigger network of the SOC, wherein the running resumption instruction is used to instruct the other cores to resume running.

8. A debugging method, executed by a debugging apparatus deployed in a host machine, wherein the host machine is located in a remote debugging system, the debugging apparatus comprises a debugger and a debugging agent, the method comprises:
determining, by the debugging agent after determining that a core A stops running in a polling manner, a reason that the core A stops running, wherein the core A belongs to a multi-core processor of a target machine in the remote debugging system;
if the reason that the core A stops running is a preset event, reporting, by the debugging agent, a second message to the debugger, wherein the second message comprises an identifier indicating that the core A stops running and an identifier of the preset event; and after receiving the second message, obtaining, by the debugger, debugging information of the preset event according to the identifier of the preset event, and setting a preset pending breakpoint as an operation object of the preset event according to the debugging information of the preset event wherein the preset event is a kernel mode code processing function or a user mode code processing function, and the operation object of the preset event is kernel mode code or user mode code; and
instructing, by the debugger, the debugging agent to send a second stop termination instruction to the core A, wherein the second stop termination instruction is used to instruct the core A to resume running, so that the core A knocks the pending breakpoint in a process of running the operation object of the preset event, and the core A enters a debugging state.

9. The method according to claim 8, wherein
the function of the kernel mode code is a kernel module loading function; and
the function of the user mode code is a process creation function, a process switching function, a process blocking function, a process wakeup function, a thread creation function, a thread switching function, a thread blocking function, or a thread wakeup function.

10. The method according to claim 8, wherein
the determining, by the debugging apparatus after determining that a core A stops running, a reason that the core A stops running, and if the reason that the core A stops running is a reason other than the preset event, instructing, by the debugging apparatus, the core A to resume running, and to collect the debugging information of the preset event which specifically comprises:
after determining, in a polling manner, that the core A stops running, determining, by the debugging agent, the reason that the core A stops running, and if the reason that the core A stops running is a reason other than the preset event, sending, by the debugging agent, a first stop termination instruction to the core A, wherein the first stop termination instruction is used to instruct the core A to resume running, and to collect the debugging information of the preset event.

11. A multi-core processor, in a remote debugging system, comprising:
a core A,
other cores that are located in the multi-core processor and that belong to a same logical group as the core A,
an input port, and
wherein: the core A is configured to: execute a first debugging exception instruction located in a header of a debugging interface function and stop running after completing execution of a processing routine of a preset event, and send a running stop signal to the other cores in a process of executing the first debugging exception instruction, wherein the running stop signal is used to instruct the other cores to stop running, and the preset event is a kernel mode code processing function or a user mode code processing function;
the input port is configured to: receive a first stop termination instruction, and forward the first stop termination instruction to the core A, wherein the first stop termination instruction is sent by a debugging apparatus in the remote debugging system after the debugging apparatus determines that the core A stops running and that a reason that the core A stops running is a reason other than the preset event;

the core A is further configured to: after receiving the first stop termination instruction and resuming running, execute a debugging information collection function to collect debugging information of the preset event, and stop running after completing the execution of the debugging information collection function, wherein the debugging information collection function comprises the debugging interface function, a first debugging exception instruction is set in the header of the debugging interface function, and the first debugging exception instruction is used to instruct the core A to stop running;

the input port is further configured to: receive a second stop termination instruction, and forward the second stop termination instruction to the core A, wherein the second stop termination instruction is sent by the debugging apparatus after the debugging apparatus sets a preset pending breakpoint as an operation object of the preset event according to the debugging information of the preset event; and the core A is further configured to: send a running resumption instruction to the other cores after receiving the second stop termination instruction and resuming running, wherein the running resumption instruction is used to instruct the other cores to resume running; and knock the pending breakpoint in a process of running the operation object of the preset event, so as to enter a debugging state.

12. The multi-core processor according to claim 11, wherein
the debugging information collection function further comprises a function associated with the preset event, a second debugging exception instruction is further set in a trailer of the debugging interface function, and the second debugging exception instruction is used to instruct the core A to stop running; and
the core A is specifically configured to: execute the function associated with the preset event to collect the debugging information of the preset event, and then execute the second debugging exception instruction located in the trailer of the debugging interface function.

13. The multi-core processor according to claim 12, wherein
the function associated with the preset event is located in a kernel debugging stub, and the kernel debugging stub is implanted into an operating system of the target machine in advance.

14. The multi-core processor according to claim 11, wherein the multi-core processor is integrated into a system on chip SOC;
the core A is specifically configured to send the running stop signal to the other cores by using a hardware cross-trigger network of the SOC, wherein the running stop signal is used to instruct the other cores to stop running; and
the core A is specifically configured to send the running resumption instruction to the other cores by using the hardware cross-trigger network of the SOC, wherein the running resumption instruction is used to instruct the other cores to resume running.

15. A debugging apparatus, wherein the debugging apparatus is deployed on a host machine in a remote debugging system, and the debugging apparatus comprises a debugging unit and a receiving unit, the debugging unit comprises a debugger and a debugging agent, wherein
the receiving unit is configured to: receive a message used for instructing a core A to stop running, and forward the message used for instructing the core A to stop running to the debugging unit, wherein a target machine located in the remote debugging system comprises a multi-core processor, and the multi-core processor comprises the core A;
the debugging agent is specifically configured to: after determining that the core A stops running, determine a reason that the core A stops running, and if the reason that the core A stops running is a preset event, report a second message to the debugger, wherein the second message comprises an identifier indicating that the core A stops running and an identifier of the preset event, wherein the preset event is a kernel mode code processing function or a user mode code processing function, and an operation object of the preset event is kernel mode code or user mode code;
the debugger is specifically configured to: after receiving the second message, obtain debugging information of the preset event according to the identifier of the preset event, and set a preset pending breakpoint as the operation object of the preset event according to the debugging information of the preset event; and
the debugger is specifically configured to instruct the debugging agent to send a second stop termination instruction to the core A, wherein the second stop termination instruction is used to instruct the core A to resume running, so that the core A knocks the pending breakpoint in a process of running the operation object of the preset event, and the core A enters a debugging state.

16. The apparatus according to claim 15, wherein
the function of the kernel mode code is a kernel module loading function; and
the function of the user mode code is a process creation function, a process switching function, a process blocking function, a process wakeup function, a thread creation function, a thread switching function, a thread blocking function, or a thread wakeup function.

17. The apparatus according to claim 15, wherein
the debugging agent is specifically configured to: after determining that the core A stops running, determine the reason that the core A stops running, and if the reason that the core A stops running is a reason other than the preset event, send a first stop termination instruction to the core A, wherein the first stop termination instruction is used to instruct the core A to resume running, and to collect the debugging information of the preset event.

18. The apparatus according to claim 15, wherein the debugging apparatus further comprises the debugger and the debugging agent;
the debugging agent is specifically configured to: after determining that the core A stops running, determine the reason that the core A stops running, and if the reason that the core A stops running is a reason other than the preset event, report a first message to the debugger, wherein the first message comprises the identifier indicating that the core A stops running and a default identifier; and the debugger is specifically configured to: after receiving the first message, instruct the debugging agent to send a first stop termination instruction to the core A, wherein the first stop termination instruction is used to instruct the core A to resume running, and to collect the debugging information of the preset event.

19. A debugging device, including a processor and a memory, wherein
the processor is configured to: after determining that a core A stops running, determine a reason that the core A stops running in a polling manner, where a target machine located in a remote debugging system includes a multi-core processor, and the multi-core processor includes the core A;
if the reason that the core A stops running is a preset event, the processor is further configured to: report a second message to a debugger, wherein the second message comprises an identifier indicating that the core A stops running and an identifier of the preset event and after receiving the second message, obtain the debugging information of the preset event according to the identifier of the preset event, and setting a preset pending breakpoint as an operation object of the preset event according to the debugging information of the preset event, where the preset event is a kernel mode code processing function or a user mode code processing function, and the operation object of the preset event is kernel mode code or user mode code;
the memory is configured to store the debugging information of the preset event; and
the processor is further configured to send a second stop termination instruction to the core A, wherein the second stop termination instruction is used to instruct the core A to resume running, so that the core A knocks the pending breakpoint in a process of running the operation object of the preset event, and the core A enters a debugging state.

20. A debugging device according to claim 19, wherein if the reason that the core A stops running is a reason other than the preset event, the processor is further configured to instruct the core A to resume running, and to collect the debugging information of the preset event.

21. A debugging device according to claim 19, wherein the function of the kernel mode code is a kernel module loading function; and
the function of the user mode code is a process creation function, a process switching function, a process blocking function, a process wakeup function, a thread creation function, a thread switching function, a thread blocking function, or a thread wakeup function.

22. A debugging device according to claim 19, wherein if the preset event is the kernel module loading function, the process creation function, or the thread creation function, the debugging information of the preset event includes a loading address of the operation object of the preset event; and
the processor is specifically configured to: obtain the loading address of the operation object of the preset event, and set the preset pending breakpoint as a destination address of the operation object of the preset event according to the loading address of the operation object of the preset event.

23. A debugging device according to claim 19, wherein if the preset event is the process switching function, the process blocking function, the process wakeup function, the thread switching function, the thread blocking function, or the thread wakeup function, the debugging information of the preset event includes an identifier of the operation object of the preset event; and
the processor is further configured to: obtain the identifier of the operation object of the preset event, determine a loading address of the operation object of the preset event according to the identifier of the operation object of the preset event, and set the preset pending breakpoint as a destination address of the operation object of the preset event according to the loading address of the operation object of the preset event.

24. A debugging device according to claim 19, wherein a correspondence between the identifier of the operation object of the preset event and the loading address of the operation object of the preset event is pre-stored in storage space of the host machine; and
the processor is further configured to obtain, from the storage space of the host machine, the loading address of the operation object of the preset event according to the identifier of the operation object of the preset event and the correspondence.

25. A debugging method, executed by a debugging apparatus deployed in a host machine, wherein the host machine is located in a remote debugging system, the debugging apparatus comprises a debugger and a debugging agent, the method comprises:
determining, by the debugging agent after determining that a core A stops running in a polling manner, a reason that the core A stops running, wherein the core A belongs to a multi-core processor of a target machine in the remote debugging system;
if the reason that the core A stops running is a reason other than a preset event, reporting a first message to the debugger, wherein the first message comprises an identifier indicating that the core A stops running and a default identifier, wherein the preset event is a kernel mode code processing function or a user mode code processing function, and an operation object of the preset event is kernel mode code or user mode code; and
after receiving the first message, instructing, by the debugger, the debugging agent to send a first stop termination instruction to the core A, wherein the first stop termination instruction is used to instruct the core A to resume running, and to collect debugging information of the preset event.

26. A debugging apparatus, wherein the debugging apparatus is deployed on a host machine in a remote debugging system, and the debugging apparatus comprises a debugging unit and a receiving unit, the debugging unit comprises a debugger and a debugging agent, wherein
the receiving unit is configured to: receive a message used for instructing a core A to stop running, and forward the message used for instructing the core A to stop running to the debugging unit, wherein a target machine located in the remote debugging system comprises a multi-core processor, and the multi-core processor comprises the core A;
the debugging agent is specifically configured to: after determining that the core A stops running, determine the reason that the core A stops running, and if the reason that the core A stops running is a reason other than a preset event, report a first message to the debugger, wherein the first message comprises an identifier indicating that the core A stops running and a default identifier, wherein the preset event is a kernel mode code processing function or a user mode code processing function, and an operation object of the preset event is kernel mode code or user mode code; and the debugger is specifically configured to: after receiving the first message, instruct the debugging agent to send a first stop termination instruction to the core A, wherein the first stop termination instruction is used to instruct the core A to resume running, and to collect debugging information of the preset event.

\* \* \* \* \*